US011787522B2

(12) United States Patent
Schulz et al.

(10) Patent No.: US 11,787,522 B2
(45) Date of Patent: Oct. 17, 2023

(54) POWER SUPPLY SYSTEM FOR A WATER-BOUND DEVICE

(71) Applicant: Siemens Energy Global GmbH & Co. KG, Bayern (DE)

(72) Inventors: Veiko Schulz, Buchholz I.D.N (DE); Wolfgang Voss, Oberreichenbach (DE); Michael Wycisk, Mönkeberg (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 259 days.

(21) Appl. No.: 17/290,922

(22) PCT Filed: Nov. 15, 2019

(86) PCT No.: PCT/EP2019/081489
§ 371 (c)(1),
(2) Date: May 3, 2021

(87) PCT Pub. No.: WO2020/099636
PCT Pub. Date: May 22, 2020

(65) Prior Publication Data
US 2021/0403135 A1 Dec. 30, 2021

(30) Foreign Application Priority Data
Nov. 16, 2018 (DE) .............. 10 2018 219 711.3

(51) Int. Cl.
*B63H 21/20* (2006.01)
*H02J 1/08* (2006.01)
(Continued)

(52) U.S. Cl.
CPC ............ *B63H 21/20* (2013.01); *B63H 21/16* (2013.01); *B63H 21/17* (2013.01); *B63H 23/24* (2013.01);
(Continued)

(58) Field of Classification Search
CPC ........ B63H 21/20; B63H 21/16; B63H 21/17; B63H 2021/207; B63H 23/24; H02J 1/082; H02J 1/10; H02J 2310/42
See application file for complete search history.

(56) References Cited

U.S. PATENT DOCUMENTS

| 2004/0102109 A1 | 5/2004 | Cratty et al. |
| 2012/0190554 A1 | 7/2012 | Hartig |
(Continued)

FOREIGN PATENT DOCUMENTS

| CN | 103532165 A | 1/2014 |
| CN | 104333033 A | 2/2015 |
(Continued)

OTHER PUBLICATIONS

PCT International Search Report and Written Opinion of International Searching Authority dated Mar. 2, 2020 corresponding to PCT International Application No. PCT/EP2019/081489 filed Nov. 15, 2019.

*Primary Examiner* — Stephen P Avila
(74) *Attorney, Agent, or Firm* — WOLTER VAN DYKE DAVIS, PLLC

(57) ABSTRACT

A power supply system for a water-bound device and to an operating method, the water-bound device having an electric shaft and in particular a first zone and a second zone, the system includes: a first DC voltage bus for a first DC voltage and a second DC voltage bus for a second DC voltage; a first energy source and a second energy source, the first energy source being provided in the first zone for supplying at least one DC voltage bus of the at least two DC voltage buses, and the second energy source being provided in the second zone for supplying at least one DC voltage bus of the at least two DC voltage buses, the energy supply system being structured at least partially in a zone-dependent manner.

13 Claims, 21 Drawing Sheets

(51) Int. Cl.
*B63H 21/16* (2006.01)
*B63H 21/17* (2006.01)
*B63H 23/24* (2006.01)
*H02J 1/10* (2006.01)

(52) U.S. Cl.
CPC ............... *H02J 1/082* (2020.01); *H02J 1/10* (2013.01); *B63H 2021/207* (2013.01); *H02J 2310/42* (2020.01)

(56) References Cited

U.S. PATENT DOCUMENTS

| | | |
|---|---|---|
| 2014/0008988 A1 | 1/2014 | Clarke |
| 2017/0353038 A1* | 12/2017 | Lindtjørn .................. H02J 1/10 |
| 2018/0159315 A1 | 6/2018 | Valen |

FOREIGN PATENT DOCUMENTS

| | | |
|---|---|---|
| DE | 102009043530 A1 | 4/2011 |
| EP | 2949571 A1 | 12/2015 |
| EP | 3046206 A1 | 7/2016 |
| WO | 2011092330 A2 | 8/2011 |
| WO | 2016116595 A1 | 7/2016 |

\* cited by examiner

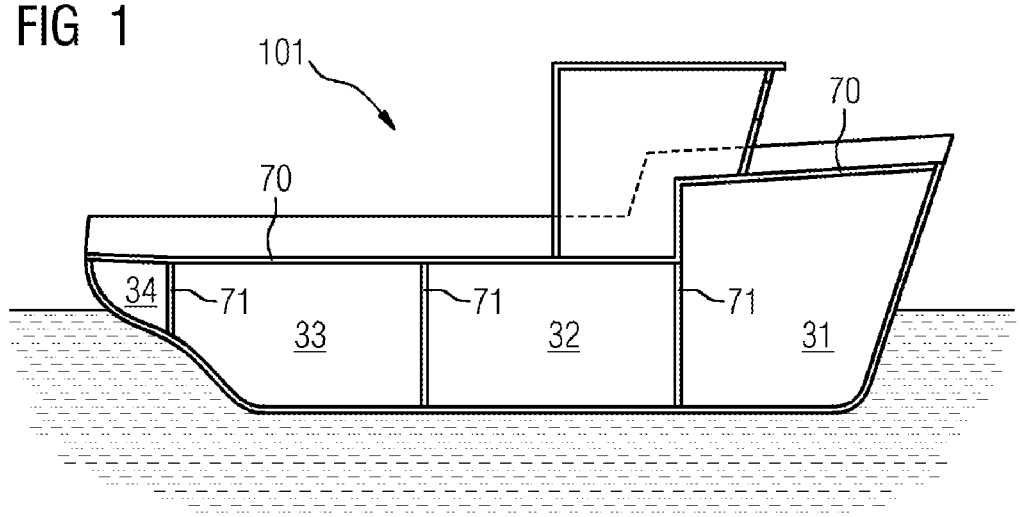
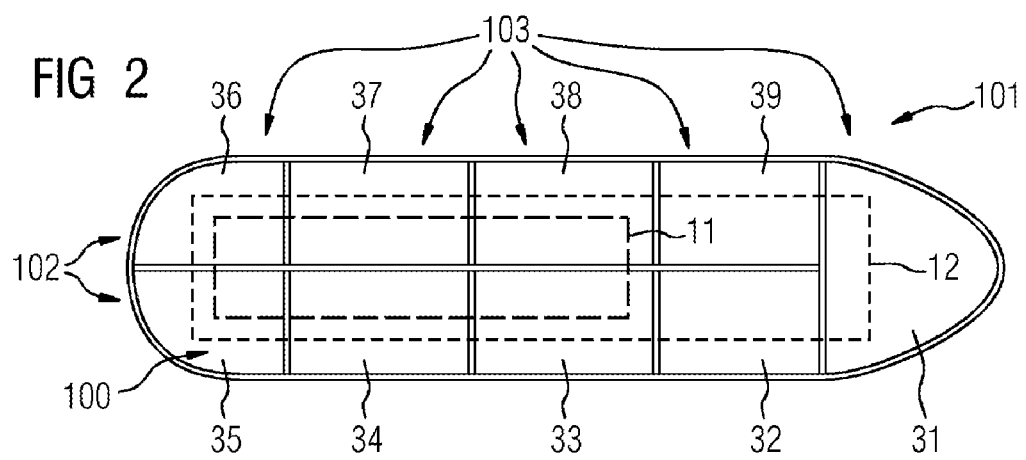
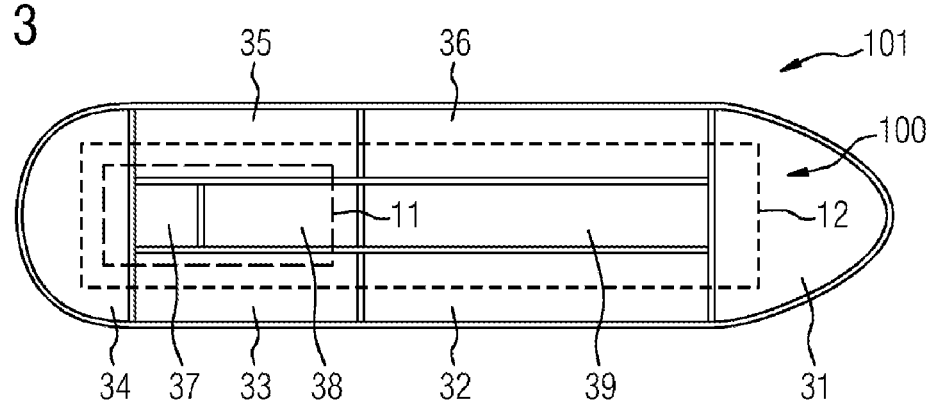

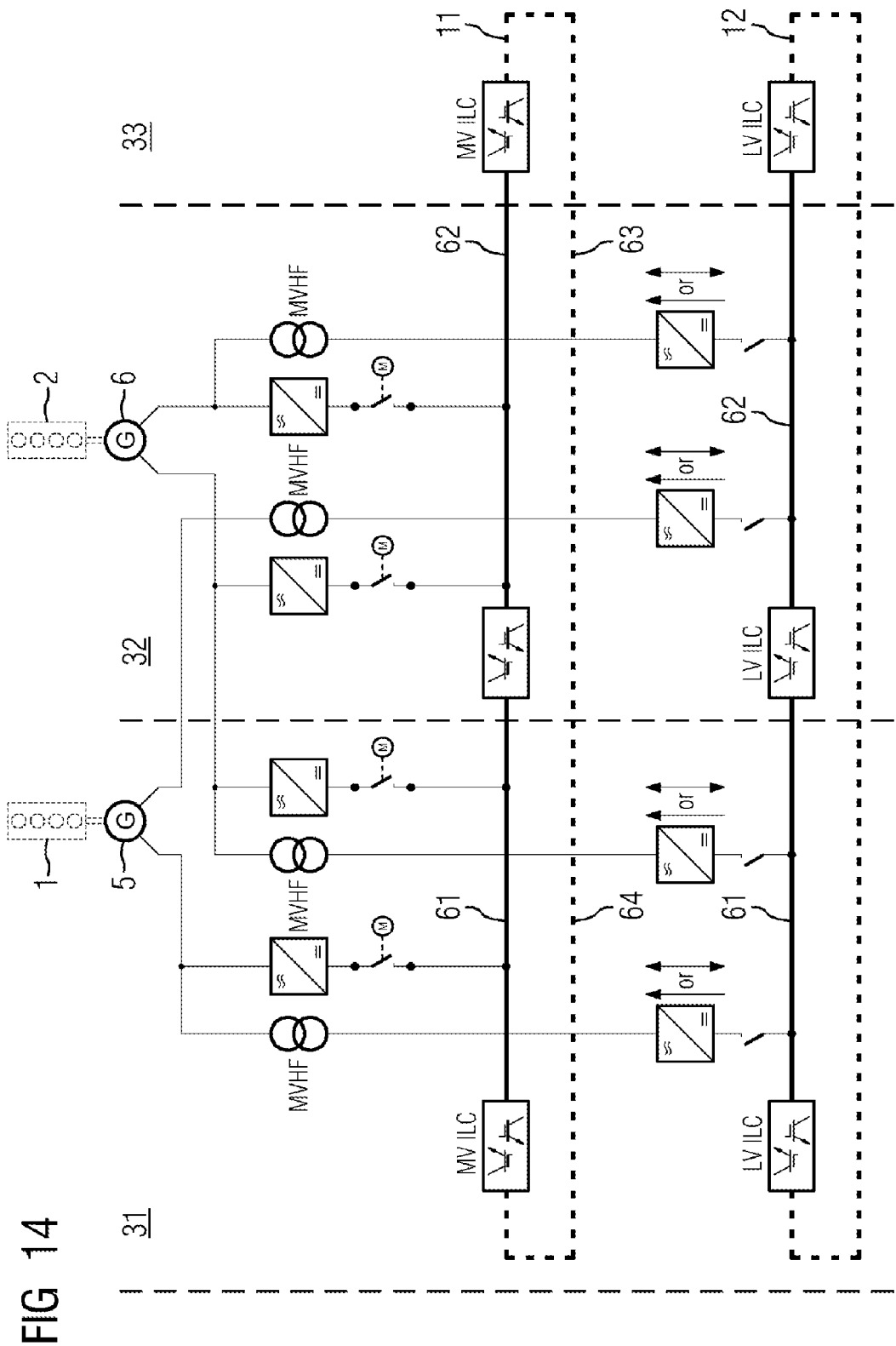

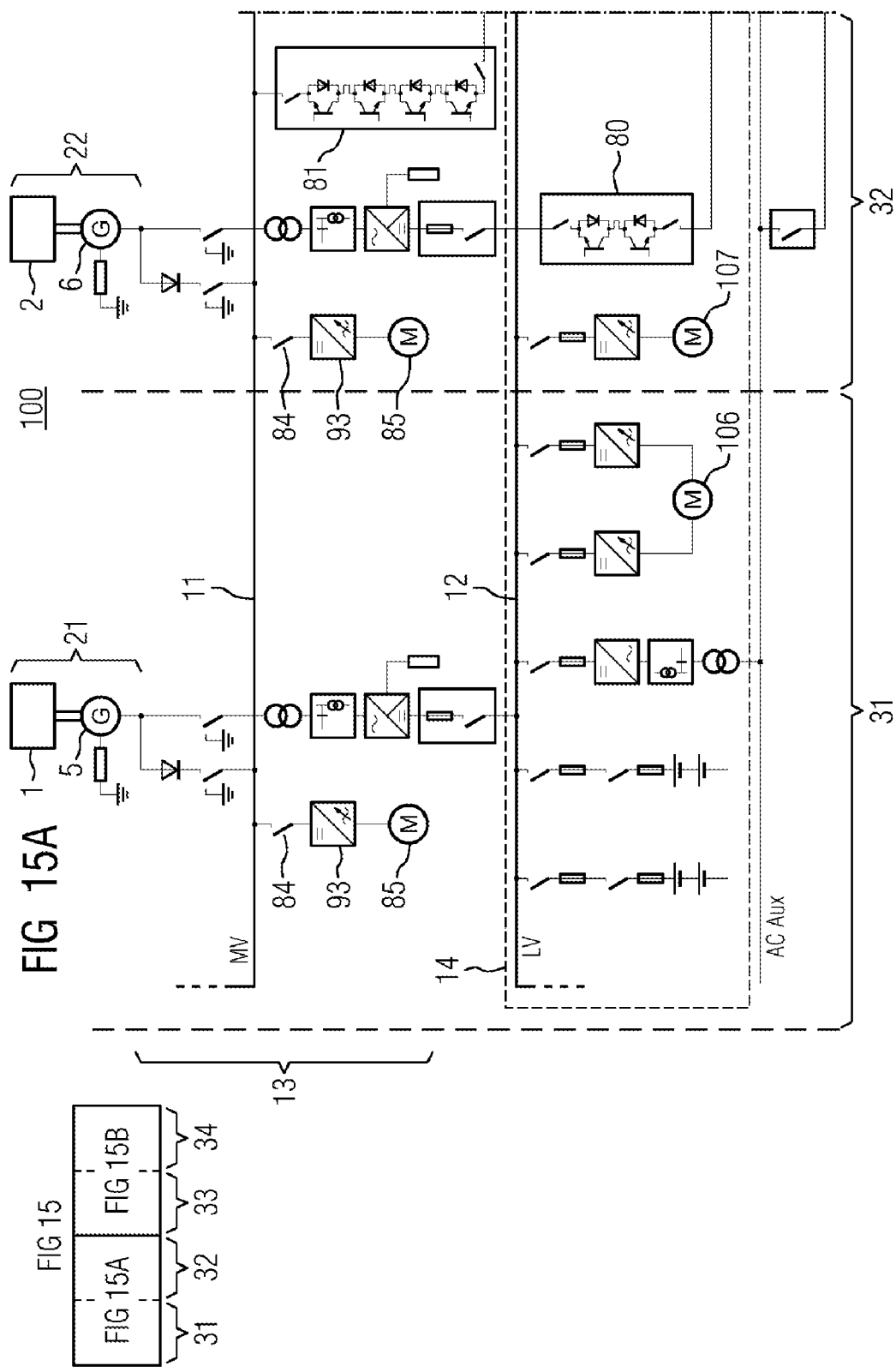

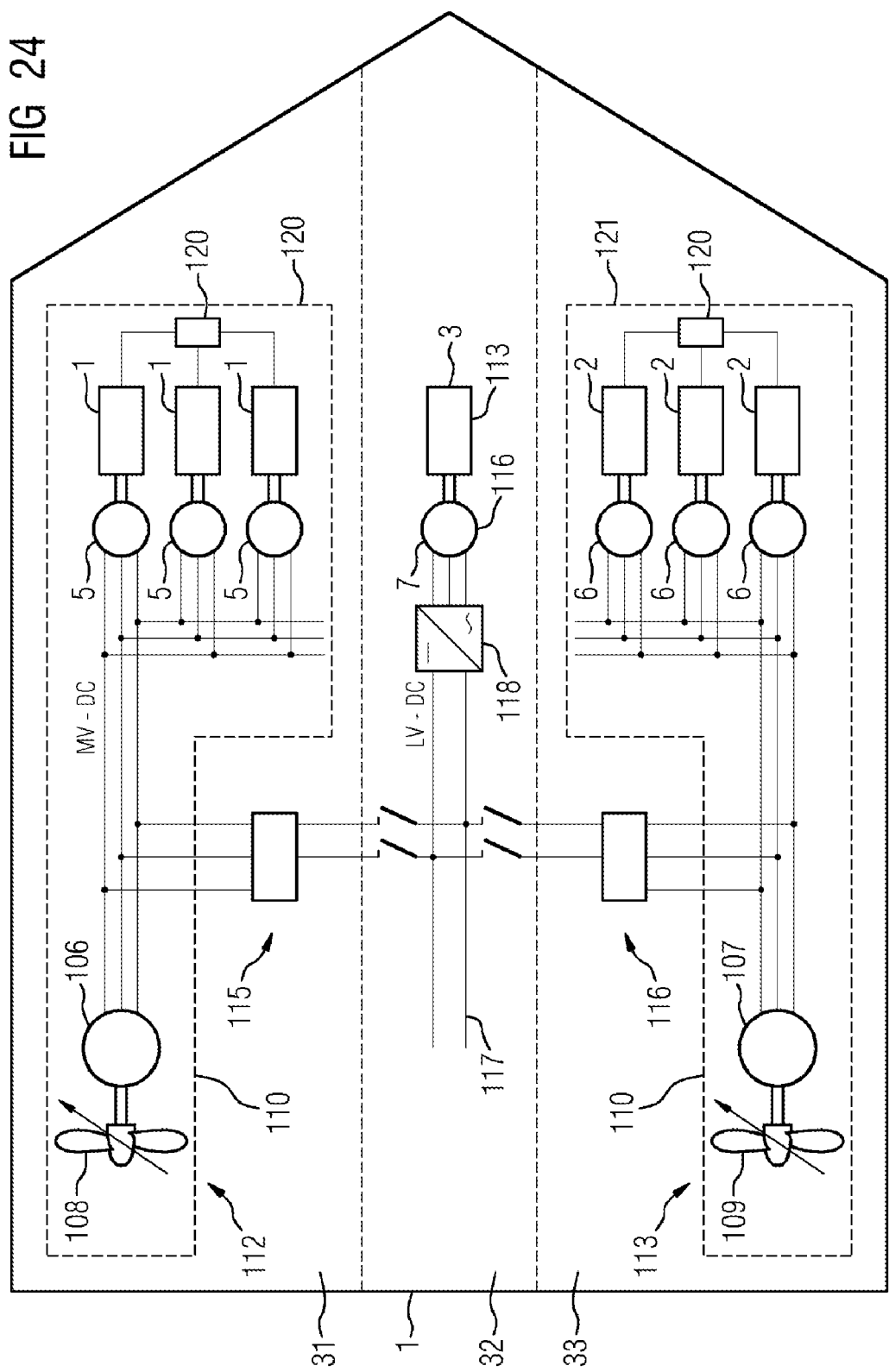

POWER SUPPLY SYSTEM FOR A WATER-BOUND DEVICE

CROSS REFERENCE TO RELATED APPLICATIONS

This application is the U.S. National Stage of International Application No. PCT/EP2019/081489 filed 15 Nov. 2019, and claims the benefit thereof. The International Application claims the benefit of German Application No. DE 10 2018 219 711.3 filed 16 Nov. 2018. All of the applications are incorporated by reference herein in their entirety.

FIELD OF INVENTION

The invention concerns a power supply system for a water-bound facility, in particular a floating facility. Floating facilities are for example ships, submarines, oil platforms and/or gas platforms. Examples of ships are cruise ships, frigates, container ships, aircraft carriers, icebreakers, etc. Floating facilities are water-bound facilities. Oil platforms or gas platforms, which stand on the seabed, are examples of water-bound facilities. Besides the power supply system, the invention also concerns a corresponding method for operating this power supply system.

BACKGROUND OF INVENTION

A power supply system for a water-bound facility, or a floating facility, has power sources. Where the text below refers to a floating facility, this also means a water-bound facility, and vice versa. Examples of power sources are a diesel generator, a fuel cell, a battery/storage battery, a flywheel, etc. The diesel engine of the diesel generator is operable using heavy-oil marine diesel and/or LNG, for example. The power supply system is intended for example to supply a drive of the floating facility with electrical power, or else auxiliary systems or other loads, such as air-conditioning system, lighting, automation systems, etc. The power supply system is in particular configurable such that at least an emergency mode for the floating facility can be facilitated even in the event of failure of a power source. The power supply of a floating facility comprises an onboard system, in particular. The onboard system (the onboard electrical system) is used for supplying electrical power to the floating facility.

If a floating facility is capable of maintaining its position, for example, then it has a multiplicity of drives. These drives comprise in particular a propeller or a waterjet (borderjet). These drives for maintaining the position of the ship in the water need in particular to be kept operational independently of one another. If this floating facility has for example two or more drive systems in the stern region, such as e.g. two POD drives or two propellers with shafts protruding from the ship's hull that are driven by an electric motor and/or by a diesel engine with a shaft generator, it is advantageous if these can be supplied with electrical power independently of one another in the event of a fault in one drive.

EP 3 046 206 A1 discloses a power distribution system on a ship. Said system has a first medium-voltage bus and a second medium-voltage bus. The second medium-voltage bus is not directly connected to the first medium-voltage bus. Additionally, the power distribution system has a first low-voltage AC bus, a first power converter between the first medium-voltage bus and the first AC bus, in order to allow a flow of power from the first medium-voltage bus to the first AC bus. Additionally, the power distribution system also has a second AC bus and a second power converter between the second medium-voltage bus and the second AC bus, in order to allow a flow of power from the second medium-voltage bus to the second AC bus.

WO 2016/116595 A1 discloses a device for distributing stored electrical power on a ship, which device also comprises one or more AC loads. In the event of failure of a primary electrical power supply, there is provision for a DC system having a multiplicity of electrical energy storage elements, in order to allow one or more AC loads to be supplied with stored electrical power. There is provision in the DC circuit for multiple cutout systems for disconnecting one or more auxiliary electrical powers.

DE 10 2009 043 530 A1 discloses a power supply system having an electrical drive shaft (electrical shaft). The electrical drive shaft comprises at least one variable-speed generator for producing a voltage having variable amplitude and variable frequency and at least one variable-speed drive motor that is supplied with this voltage. The generator has for example a superconducting winding, in particular a high-temperature superconducting (HTS) winding.

WO 2011/092330 A2 discloses a ship drive system having at least a first and a second electrical drive shaft (electrical shaft) for driving one propulsion unit in each case, in particular a waterjet or e.g. a propeller, wherein each of the electrical drive shafts comprises at least one variable-speed generator, driven by an internal combustion engine, for producing a motor voltage having variable amplitude and variable frequency and at least one variable-speed drive motor that is supplied with this motor voltage and coupled to a propulsion unit, the first and second drive shafts being switchable from a first operating state, in which they are electrically isolated from one another, to a second operating state, in which they are electrically coupled to one another such that a power transfer from the at least one generator of one drive shaft to the at least one drive motor of the other drive shaft can take place.

EP 2 949 571 A1 discloses a drive system for a ship, wherein the ship has an onboard electrical system having a fixed onboard system frequency, wherein the drive system comprises an electric drive motor for driving the ship, a frequency converter via which electrical power from the onboard system is suppliable to the electric drive motor, a drive machine, a drive generator driveable by the drive machine, and an electrical shaft for connecting the electric drive motor to the drive generator, the electric drive motor being driveable either by the frequency converter or by the drive generator.

In onboard electrical systems, the electrical power is often required at different voltage levels and/or in different voltage forms (AC or DC). To this end, for example primary energy is made available from one or more internal combustion engines and converted into electrical power by means of one or more three-phase generators (asynchronous generator or synchronous generator). This electrical power is generated in particular on the highest voltage level available in the onboard system (supply system upper voltage level). In order to produce further voltage levels, transformers and/or DC/DC converters are used, for example. The transformers usually have high weight and physical volume, losses of approximately 1%, and the input and output frequencies are always identical. By way of example, the total generator output produced is supplied using the upper voltage level and distributed to a main power bus. The main power bus in many installations or onboard systems is a 3-phase AC bus (AC=alternating current), which spans an AC system. The electrical power in this case is distributed in particular using one or more control panels. In AC systems, the frequency of a lower system is identical to the frequency of the upper system. The lower system is distinguished from the upper system in this case by the voltage, the upper system having a higher voltage than the lower system. The use of an AC system having an AC power bus for distributing the electrical power can be disadvantageous if the frequency at the upper voltage level is variable. Variable frequencies are particularly the consequence of variable-speed internal combustion engines. Usually, multiple transformers are required in order to supply power to a lower voltage level from an upper AC power bus. The power is thus transferred via the upper AC main power bus using the upper voltage level. The power within a voltage level can be distributed using switchgear. AC is distributed using AC switchgear. The voltage magnitude of the power bus or of the voltage level is substantially dependent on the installed capacity. The different loads are fed and the underlying voltage levels are supplied with power. To connect the different voltage levels, transformers are required in AC networks, which means that the voltage levels have the same frequency. The transformation ratio of the transformer used defines the ratio of the voltages.

In the case of some ships, it is difficult to use diesel engines, which are able to drive a generator for producing electrical power, as internal combustion engines, since diesel engines are heavy. Diesel engines also require space. Challenges can also arise as a result of there being restrictions in regard to the installed capacity, and/or the voltage or frequency of the electrical energy produced needing to be kept within a specific band within operation. An electrical shaft can achieve some advantages in this regard. The electrical shaft results in a direct coupling between the generator and the drive motor. The drive motor is coupled directly to the generator such that a proportionality arises between the frequency of the generator and the drive motor (motor). Proportionality is dependent on the number of pole pairs of the generator or of the rotor.

Since the loads on the floating facility make different demands on the power supply system and, depending on the operating condition of the floating facility, different loads also draw power from the power supply system, the power supply system needs to be designed as flexibly as possible.

SUMMARY OF INVENTION

It is accordingly an object of the present invention to provide a flexible power supply system and a flexible method for operating such a power supply system. It is a further object of the present invention to specify a power supply system that is improved in regard to the weight of the devices required for the power supply system.

The object is achieved according to the independent claims. Further configurations of the invention are obtained according to the dependent claims.

A power supply system for a water-bound facility has an electrical shaft, wherein the electrical shaft is connectable to a first DC voltage bus for a first DC voltage and to a second DC voltage bus for a second DC voltage, wherein the electrical shaft comprises at least one variable-speed generator, driven by an internal combustion engine, for producing a motor voltage having variable amplitude and variable frequency and at least one variable-speed drive motor that is supplied with this motor voltage and coupled to a propulsion unit.

In one configuration of the power supply system, the following can be achieved or implemented. Instead of an AC bus at fixed frequency, a power supply system based on DC bus systems can be used, there being provision for an electrical shaft for the drive; the coupling provided between a low-voltage DC voltage bus (LV-DC) and a medium-voltage DC voltage bus (MV-DC) is a bidirectional DC/DC chopper, for example. The water-bound facility, which in particular has a high power requirement of greater than 5 MW, for example, has one or two propellers or one or two waterjets, for example. To produce electrical power by means of generators, there can be provision for e.g. one to four gas turbines. The power from the gas turbines can thus be used to operate propellers or waterjets. The gas turbines are thus in particular part of an electrical shaft or assigned to an electrical shaft. In one configuration, a ship has two to four propellers. A propeller in this case has in particular a power of between 4 MW and 12 MW, in particular at least 5 MW. A hotel load, in particular on a cruise ship, or the remaining electrical power of the water-bound facility is substantially less than the drive power. This can involve a ratio of one to ten, for example, or a required power of less than 10 MW may be necessary.

A typical speed of a turbogenerator is 3000 revolutions per minute or higher. A propeller speed is between 100 and 300 revolutions per minute, for example.

In one configuration of the power supply system, said power supply system can be operated in multiple possible modes. The drive power can come from a DC voltage bus, for example. Furthermore, the drive power can come from a turbogenerator. Furthermore, the drive power can come from a turbogenerator and from a DC voltage. Furthermore, the drive power can come from a turbogenerator, with an electrical power produced therefrom being fed to a DC voltage bus. Superconducting materials can be used for motors and/or generators in the power supply system. These are special high-temperature superconductors (HTS). The high-temperature superconduction relates in particular to at least one component such as the motor or the generator of the electrical shaft.

Various modes can be realized for the electrical shaft (also referred to as an eShaft). Examples of different modes in a tabular form in this regard are:
 mode 1: purely electrical mode
 mode 2: with electrical shaft
 mode 3: with electrical shaft
 mode 4: with electrical shaft
 mode 5: with electrical shaft

| Mode | Turbogenerator is active and supplies power | Drive motor of the electrical shaft is fed (by the turbogenerator) | At least one DC bus supplies power for the drive motor of the electrical shaft | At least one DC bus is supplied with electrical power (at least in part by the turbogenerator) |
|---|---|---|---|---|
| 1 |   |   | X |   |
| 2 | X | X |   |   |

-continued

| Mode | Turbogenerator is active and supplies power | Drive motor of the electrical shaft is fed (by the turbogenerator) | At least one DC bus supplies power for the drive motor of the electrical shaft | At least one DC bus is supplied with electrical power (at least in part by the turbogenerator) |
|---|---|---|---|---|
| 3 | X | X | X | |
| 4 | X | X | | X |
| 5 | X | X | X | X |

The use of DC/DC choppers, which are in particular of bidirectional embodiment, allows a low-voltage DC system (LV-DC) to be connected to an electrical shaft, no conventional transformer being required. Advantageously, medium-frequency (MF) or high-frequency (HF) transformers can be used in order to save weight and/or space. In comparison with a 50/60 Hz transformer, a 1000 Hz transformer can be used to save approximately 90% of the weight. Higher switching frequencies and an improved transformer material afford the potential for a further reduction in weight and space or the potential for an increase in efficiency.

If for example there is provision for only one power source for the electrical shaft, the use of batteries, fuel cells, flywheels, etc., is advantageous, this relating both to the LV DC side and to the MV DC side.

The use of the electrical shaft in conjunction with DC buses allows transformation steps (use of transformers) to be reduced and an improved flow of power to be achieved. The connection of the electrical shaft to an MVDC bus and a further DC/DC chopper allows DC isolation of the electrical shaft from energy storage systems (ESS) such as a battery or an LV DC bus. The use of a gas turbine as power source for the electrical shaft leads to a reduction in weight in comparison with a diesel engine. This allows the metacentric height to be improved.

The power supply system can also have a drive motor having a low-voltage winding (LV) and a medium-voltage winding (MV). The medium-voltage winding can be supplied with power from the LVDC bus via an inverter.

In one configuration of the power supply system with drive powers of greater than 5.5 MW per drivetrain, it is also possible for diesel engines to be used, for example. Electrical power is distributed in particular via a medium-voltage control panel. The drive motors are fed by power converters.

In one configuration, the power supply system for a water-bound facility, and in particular for a floating facility, thus has a first DC voltage bus for a first DC voltage and a second DC voltage bus for a second DC voltage. This means that the first DC voltage bus is suitable or intended for a first DC voltage level and the second DC voltage bus is suitable or intended for a second DC voltage level. The first DC voltage level is in particular higher than the second DC voltage level. The first DC voltage level thus corresponds to the first DC voltage bus and the second DC voltage level corresponds to the second DC voltage bus. By way of example, the DC voltage levels differ by a factor of between 5 and 50. A similar situation arises for a water-bound or floating facility, in particular a ship, that has a power supply system in one of the configurations described.

In one configuration, the floating or water-bound facility and/or the power supply system has a first zone and a second zone. Here too, as already remarked above, a floating facility is also supposed to be understood to mean a water-bound facility in the remainder of this document. The floating facility can also have more than two zones. The type of the zones can differ. As such, a zone can be a fire zone, for example. Zones can be separated from one another by one or more bulkheads. This forms chambers that can serve for example to protect against fire and/or to protect against the floating or water-bound facility sinking. A bulkhead, or bulkheads, can be of airtight and/or liquid-tight and/or flame-retardant design or embodiment. In a floating facility such as a ship, for example, there can be for example at least one transverse bulkhead and/or a longitudinal bulkhead and/or a watertight deck. However, zones or chambers are formed. A chamber can be a zone, just as a zone can be a chamber. The power supply system for the floating or water-bound facility has a first power source and a second power source, wherein the first power source in the first zone is intended to feed at least one DC voltage bus of the at least two DC voltage buses and wherein the second power source in the second zone is intended to feed at least one DC voltage bus of the at least two DC voltage buses. The first power source may thus be intended for example to feed only the first DC voltage bus or may be intended to feed the first DC voltage bus and the second DC voltage bus. The situation is similar with the second power source, which may be intended for example to feed only the first DC voltage bus or may be intended to feed the first DC voltage bus and the second DC voltage bus. The feeding of the respective DC voltage bus in this case concerns in particular a direct connection to the DC voltage bus. A direct connection is intended to be understood to mean an electrical connection for which there is no further DC bus interposed for power distribution. However, a direct connection can comprise a power converter, a transformer, a switch, a DC/DC chopper, for example. Power sources of the power supply system can be of the following type, for example: a diesel generator, a gas turbine generator, a battery, a capacitor, SUPER caps, a flywheel store, fuel cells.

In one configuration of the power supply system, at least part thereof is subdivided in zone-dependent fashion. In particular, the subdivision corresponds locally to the zone split for at least two zones. Zones of the water-bound facility are obtained in particular as a result of a physical device such as a bulkhead. A subdivision of the power supply system is obtained in particular as a result of switching devices that can break or make an electrical connection. Such switching devices can form sections in the power supply system.

In one configuration of the power supply system, a distinction is drawn between primary power sources and secondary power sources. Primary power sources are assigned to the first DC voltage bus (DC bus), a primary power source being used in particular for producing electrical power for the main drive of the floating or water-bound facility. This assignment means that there is no other DC voltage bus interposed between this primary power source and the first DC voltage bus. Secondary power sources are assigned to the second DC voltage bus (DC bus), a secondary power source being used in particular for producing electrical power for operating systems of the floating or water-bound facility that are not used for the main drive of the floating facility. This assignment also means that there is no other DC voltage bus interposed between this secondary power source and the second DC voltage bus. Operating systems of the floating facility are for example (onboard supply, hotel operation, weapons systems, etc.). In one configuration of the power supply system, secondary power sources are chosen such that they may be able to react more quickly to load fluctuations. The load is for example at least one drive motor for driving the floating facility and/or other electrical loads of the floating facility for, by way of example, pumps, compressors, air-conditioning systems, winches, onboard electronics, etc. On a cruise ship, electrical loads for, by way of example, the air-conditioning system, the laundry, the lighting, etc., are also referred to as hotel load.

The power supply system can have multiple power sources of the same type. In one configuration of the power supply system, power sources of different type can be in different zones. As a result, the supply reliability within the floating facility for example in emergencies and/or in a fault situation can be increased.

The use of a first DC voltage bus and a second DC voltage bus in the floating facility allows electrical power to be easily transferred from one bus to the other bus without unnecessary losses. This is advantageous in particular in a fault situation in which one or more power sources for the first bus fail. If power levels are linked via an AC connection, this can lead to higher losses, in particular in a fault situation. In DC systems, the power is first rectified, in order to be distributed on the upper DC voltage (conversion 1). Next, an AC voltage needs to be produced from the DC voltage by means of an inverter (conversion 2). The inverter needs to perform the same functions as a generator (selectivity and frequency management in the lower voltage level). Adaptation of the voltage requires a transformer (conversion 3). This threefold conversion has associated losses of approximately 3-3.5%. The costs of the components and the weights are very high. The inverters used are sensitive toward harmonics of the lower voltage level. Connecting motors and nonlinear loads to the inverters used is also problematic and limited. The proposed power supply system, which has a first DC voltage bus and a second DC voltage bus, can be used to reduce losses.

In one configuration of the power supply system, said power supply system has not only the first power source and the second power source but also a third power source. The first power source and the second power source are primary power sources, for example, and the third power source is a secondary power source. The third power source can be used for peak shaving, for example. This means that peaks in the power consumption of the floating facility that cannot quickly be covered by the primary power source are covered by the secondary power source.

In one configuration of the power supply system, the power bus, in particular the further main power bus or else the substitute for the DC bus, that is used can also be, in addition to a DC bus, a three-phase AC bus (AC bus). A DC distribution system (DC bus) and/or an AC distribution system (AC bus) can also be used for a low-voltage level.

A power supply system for a water-bound facility, in particular a floating facility, is thus also able to be embodied with a first DC voltage bus for a first DC voltage and with a second DC voltage bus for a second DC voltage, wherein the power supply system has a first power source, the first power source having a generator system that has a first winding system for feeding the first DC voltage bus and that has a second winding system for feeding the second DC voltage bus. As such, one generator system can be used to feed various voltage levels. If the power supply system has other power sources, these can also have such a generator system.

In one configuration of the power supply system, this meaning, as hitherto and below, all the power supply systems described, the first winding system is designed for a first voltage and the second winding system is designed for a second voltage, the first voltage being higher than the second voltage. The generator system has for example only one generator or e.g. two generators. The generator is in particular a synchronous generator. Asynchronous generators can also be used. If the synchronous generator has a low-voltage winding system and a medium-voltage bus winding system, then it has in particular a high Xd". The three-phase medium-voltage terminal of the generator can be connected to a diode rectifier or to a controlled rectifier, for example, so as thus to feed the medium-voltage DC bus. This also applies in a comparable manner to the three-phase low-voltage terminal for the low-voltage DC bus. The power converter for the low-voltage DC bus may in particular also be an active front end (AFE). This has four-quadrant operation, in particular. As a result, for example it is possible to feed electrical power from batteries to the low-voltage DC bus, and from there via the active front end to the medium-voltage DC bus.

In one configuration of the power supply system, the first winding system is electrically connected to the first DC voltage bus for the purpose of feeding the latter in transformerless fashion. The absence of a transformer allows weight to be saved.

In one configuration of the power supply system, the second winding system is electrically connected to the second DC voltage bus for the purpose of feeding the latter in transformerless fashion. Here too, the absence of the transformer saves weight.

In one configuration of the power supply system, the generator system has a first generator having the first winding system and a second generator having the second winding system, wherein the first generator and the second generator are driveable by means of a common shaft system. The first generator and the second generator are in particular stiffly coupled. The use of two generators for the two winding systems allows the design of the generators to be kept simple.

In one configuration of the power supply system, the generator system is a multi-winding system generator, wherein the stator of the multi-winding system generator has the first winding system and the second winding system. This allows a compact generator system to be formed.

In one configuration of the power supply system, the multi-winding system generator has grooves that concern the first winding system and the second winding system. This allows a compact design to be realized.

In one configuration of the power supply system, the water-bound facility, such as in particular the floating facility, has a first zone, a second zone and a second power source, wherein the first power source in the first zone is intended to feed at least one DC voltage bus of the at least two DC voltage buses and wherein the second power source in the second zone is intended to feed at least one DC voltage bus of the at least two DC voltage buses. It is thus possible for the reliability of the supply of electrical power to the DC voltage buses to be improved.

A power supply system for a water-bound facility, in particular a floating facility, is also able to be embodied with a first DC voltage bus for a first DC voltage and with a second DC voltage bus for a second DC voltage, wherein a first power source has at least three feeding electrical connections to the DC voltage buses, wherein at least one of the DC voltage buses has sections. This too allows the supply reliability of the power supply system to be improved.

In one configuration of the power supply system, a first feeding connection of the at least three feeding electrical connections feeds a first section and a second feeding connection of the at least three feeding electrical connections feeds a second section of the same DC voltage bus, wherein a third feeding connection of the at least three feeding electrical connections feeds a section of the other DC voltage bus. It is thus possible for the feed of electrical power to be distributed over different DC voltage buses.

In one configuration of the power supply system, said power supply system has a fourth feeding connection of the first power source, wherein two of the at least four feeding connections are intended to feed the first DC voltage bus in different sections of the first DC voltage bus and wherein two other of the at least four feeding connections are intended to feed the second DC voltage bus in different sections of the second DC voltage bus. This increases the dependability of the water-bound facility.

In one configuration of the power supply system, the water-bound facility has a first zone and a second zone, wherein the first DC voltage bus and/or the second DC voltage bus extends via the first zone and/or the second zone, wherein the first power source is intended to feed sections of the first DC voltage bus and/or of the second DC voltage bus in different zones. This allows the redundancy for the supply of electrical power to the DC voltage buses to be increased.

In one configuration of the power supply system, said power supply system has a second power source, wherein the first power source in the first zone is intended to feed at least one DC voltage bus of the at least two DC voltage buses and wherein the second power source in the second zone is intended to feed at least one DC voltage bus of the at least two DC voltage buses. It is thus possible for both DC voltage buses to be supplied with electrical power, even if only one power source is active.

In one configuration of the power supply system, a section of the first DC voltage bus has both a feeding connection to the first power source and a further feeding electrical connection to the second power source. This too allows the flexibility of the system to be improved.

In one configuration of the power supply system, a section of the second DC voltage bus has both a feeding connection to the first power source and a further feeding electrical connection to the second power source. Feeding connections here can also generally have a switch, however, in order to be able to flexibly activate and deactivate the feeding connection (the feeding electrical connection).

In one configuration of the power supply system, at least one of the DC voltage buses is able to be or is in the form of a ring bus. The ring bus is splittable by switches. In particular, a ring bus can be divided into two smaller ring buses. The possibility of splitting the ring bus allows flexible reaction to faults.

In one configuration of the power supply system, the first DC voltage bus is intended for a first DC voltage and the second DC voltage bus is intended for a second DC voltage, the first DC voltage being higher than the second DC voltage. In particular, the lower voltage is a low voltage (LV) and the higher voltage is a medium voltage (MV). The low voltage is in particular between 400 V and 1000 V. The medium voltage is higher than 1000 V, in particular between 10 kV and 20 kV. For example, the following are possible values for the medium voltage: 5 kV, 6 kV, 12 kV and 18 kV.

In one configuration of the power supply system, the first DC voltage bus is connected to the second DC voltage bus for example via at least one of the following couplings:
DC/DC converter
inverter-transformer-rectifier In one configuration of the power supply system, the first DC voltage is thus higher than the second DC voltage. In particular, the first DC voltage is a medium voltage (MV) and the second DC voltage is a low voltage (LV), wherein a power transfer from the first DC voltage bus to the second DC voltage bus is possible, as is a power transfer from the second DC voltage bus to the first DC voltage bus. This increases the flexibility, usability and fault tolerance of the power supply system.

In one configuration of the power supply system, the first DC voltage bus is intended for a first DC voltage and the second DC voltage bus is intended for a second DC voltage, the first DC voltage being higher than the second DC voltage. As such, loads such as motors, electronics, heating systems, etc., can be supplied with electrical power using a suitable voltage level.

In one configuration of the power supply system, at least one of the DC voltage buses is intended to extend via at least two zones. As a result, for example a zone that itself has no power source can be supplied with electrical power.

In one configuration of the power supply system, a zone is bypassable by means of a bypass. As such, for example a zone that is under water or in which fire has broken out can be isolated from the electrical supply without another zone in which the applicable bus extends being impaired.

In one configuration of the power supply system, at least one of the DC voltage buses has sections, wherein the sections are zone-related. The sections are able to be isolated from one another by means of switches, for example. A switch in this case can be a mechanical switch and/or a mechanical and semiconductor switch.

In one configuration of the power supply system, two zones can have two sections. In another configuration, one zone can have two sections of the same bus. In another configuration, each zone having a section has its own power source.

In one configuration of the power supply system, the first power source in the first zone is intended to feed the first DC voltage bus and the second DC voltage bus. As such, for example both voltage levels in a zone can be supplied with power.

In one configuration of the power supply system, the first DC voltage bus is intended to feed the second DC voltage bus. As such, a power source connected to the first DC voltage bus can also supply power to the second DC voltage bus.

In one configuration of the power supply system, said power supply system has a three-phase bus, wherein the second DC voltage bus is intended to feed the three-phase bus. The three-phase bus can extend via at least two zones or be limited to one zone. In one configuration, it is also possible for the three-phase bus to bypass one or more zones, i.e. there is a bypass for at least one zone. The three-phase bus (AC current) is intended to supply power to AC loads. On a cruise ship, for example, these can also be galley equipment connectable to sockets, such as toasters, waffle irons or coffee machines.

In one configuration of the power supply system, it is possible, in particular depending on a ship application, to at least partly integrate an AC distribution system at the low-voltage level into a medium-voltage DC distribution system or to form individual DC islands within the zones, which are connected between the zones via AC connections. In one configuration of the power supply system, individual DC islands are connected to one another via DC/DC converters.

In one configuration of the power supply system, a zone is operable independently, wherein this independent zone has at least one of the power sources, wherein the first DC voltage bus and/or the second DC voltage bus are able to be fed, wherein the respective sections of the first DC voltage bus and the second DC voltage bus also remain in this zone. A section thus does not go beyond a zone. As such, independent areas within a floating facility can be set up that are capable of working by themselves even in the event of failure or damage in one of the zones of the floating facility.

In one configuration of the power supply system, the floating facility has at least two longitudinal zones and at least two transverse zones, wherein two sections of at least one DC voltage bus are in the same transverse zone and also in different longitudinal zones. As such, for example faults that occur on one side of a ship can be limited in respect of the effect on the electrical power supply. The longitudinal zone is limited by a longitudinal bulkhead, for example. The transverse zone is limited by a transverse bulkhead, for example.

In one configuration of the power supply system, at least one of the DC voltage buses has a switching device (switch). The switching device, which operates mechanically and/or electrically by means of semiconductors, is used for isolating and connecting sections of the respective buses. The switching device can be tripped for isolation or connection on the basis of switching commands that are generated owing to an electrical condition and/or occur on the basis of switching commands that are generated owing to events in a zone (e.g. water ingress, fire, etc.).

In one configuration of the power supply system, the switching device in the DC voltage bus is a short-circuit switch. The switching device in particular isolates two zones. The switching device is for example a fast-acting switch that allows safe isolation of sections of a bus. As such, a short circuit in a zone can be limited to this zone. Other zones remain largely unaffected by a short circuit in one of the multiplicity of zones. Shutting down and restarting the power supply in the event of a short circuit is therefore avoidable. The likelihood of a blackout for the entire floating facility can therefore be reduced.

In one configuration of the power supply system, at least one internal combustion engine is a gas turbine. Gas turbines allow high rotation speeds and a compact design.

A method for operating a power supply system of a floating facility, wherein the floating facility has a first zone and a second zone, wherein the floating facility has a first DC voltage bus for a first DC voltage and a second DC voltage bus for a second DC voltage, wherein the floating facility has a first power source and a second power source, involves electrical power being transferred from the first zone to the second zone or from the second zone to the first zone. As such, zones can be supplied with electrical power independently of whether they have a power source, for example.

A method for operating a power supply system for a water-bound facility, having a first DC voltage bus for a first DC voltage and having a second DC voltage bus for a second DC voltage, having a first power source, wherein the first power source has a generator system that has a first winding system for feeding the first DC voltage bus and that has a second winding system for feeding the second DC voltage bus, involves the first winding system being used to produce a first voltage and the second winding system being used to produce a second voltage, the second voltage being lower than the first voltage, wherein the generator system is driven using a diesel engine or a gas turbine. This and other methods can be complemented by and/or combined with other configurations.

In one configuration of the method, the feed by the first winding system or the feed by the second winding system is prevented. As such, for example in the case of a cruise ship in a port, the hotel load thereof can be attended to by means of just one winding system.

A method for operating a power supply system for a water-bound facility, having a first DC voltage bus for a first DC voltage and having a second DC voltage bus for a second DC voltage, having a first power source that has at least three feeding electrical connections to the DC voltage buses, wherein at least one of the DC voltage buses has sections, involves the DC voltage buses being supplied with electrical power. The feeding electrical connections have for example switches in order to break or make the connection. As such, for example faulty areas (e.g. as a result of a short circuit) of the power supply system can be isolated from correctly operating areas.

In one configuration of the method, a power supply system as described here is used for performing the method.

In one configuration of at least one of the methods, a fault results in a bulkhead being closed and at least one of the DC buses being isolated in bulkhead-dependent fashion. As such, in particular in the event of a fault, this fault can be limited to one zone.

In one configuration of at least one of the methods, first power management is performed for at least the first zone and second power management for at least the second zone. As such, for example each zone that has a power source can have power management by means of a power management system, wherein the power management systems of different zones are connectable to one another for data communication purposes. In particular, a master power management system can be defined that controls and/or regulates the flow of power between the zones managed by the individual power management systems. A wired or radio-based transmission system can be used for data transfer. The radio-based transmission system is better able to cope with faults that occur for example as a result of mechanical damage within a zone.

In one configuration of at least one of the methods, said method can be used with any of the configurations and combinations of the power supply system that are described here. The high flexibility of the method and of the power supply system allows flexible operation of the floating facility.

The power supply system described here can be used to realize a network architecture for powerful ship systems having at least two voltage levels. In DC systems, the electrical power is rectified and distributed using the common DC bus. Large AC loads, such as e.g. main and auxiliary drives, are fed from the DC bus via inverters. AC subsystems require an inverter and a transformer. The voltage can be selected by means of the transformation ratio of the transformer, as in the case of a conventional AC main system. The frequency is adjustable by the inverter independently of the speed of the generators. The increased use of DC voltage buses means that the problems present in the AC systems in reference to a high weight of the transformers and different frequencies of the systems with reference to the generator can be avoided. When a DC network architecture having at least two DC voltage levels (medium voltage (MV) and low voltage (LV)) is used, the need to use transformers is reduced. The network architecture is distinguished in particular by at least two DC bus systems (LV and MV), which can be designed as a closed bus. These DC ring buses are made possible in particular by the use of a very fast semiconductor switch for LV and MV, in order to ensure the integrity of the individual bus sections in the zones in the event of a fault. This prevents faulty bus sections from leading to failures in other bus sections. The integration of an LV DC ring bus in addition to an MV ring bus allows local energy storage systems to be connected to the LV DC ring bus and, as a result of the closed bus, the use and distribution of the power. The local energy storage systems in this case are in particular secondary power sources. The use of multiple closed DC ring buses in particular also allows a better opportunity for power splitting between the ring buses of the different voltage levels. One option for connecting the different voltage levels is provided by means of a DC/DC converter. Another option is for a transformer and a rectifier on the AC side of the generator to be used to supply power to the other DC ring bus while the DC ring bus having the higher output/higher voltage is supplied with power directly via a rectifier. If energy stores are connected to the low-voltage DC ring bus, the rectifier of the low-voltage ring bus can also be embodied as an active inverter, in order to allow power to flow in both directions. The infeed for the generator via rectifiers or controlled rectifiers also allows a higher frequency for the generator output voltage, which decreases the weight and dimensions of the requisite transformer.

In one configuration of the power supply system, a generator has at least two voltage levels. This allows the system to be optimized further and a heavy transformer to be avoided. The use of generators having at least two voltage levels allows a first voltage level and a second voltage level to be supplied with power. This concerns in particular the first DC voltage bus and the second DC voltage bus alike, these each being connected to the generator via a rectifier. This allows the repeated conversion of power as in AC systems to be avoided. Arrangements that cover the upper and second voltage levels are appropriate in this case, since the outputs at the 2nd and other lower voltage levels decrease ever further.

In one configuration of the power supply system, the generator frequency can be selected freely within certain limits. When generators having separate windings are used, different frequencies are also possible for the different voltages. The frequencies and other machine parameters influence the stability of the assigned DC system. The two voltage levels are fed independently of one another by different generator windings, or core-and-winding assemblies. It is irrelevant whether the core-and-winding assemblies are set up in a housing on a shaft or in tandem arrangement. Operation at two shaft ends is also possible.

In one configuration of the power supply system, the core-and-winding assembly length of the generator is shortened. A generator can thus have two different core-and-winding assembly lengths, for example. This is accomplished for example by the use of new manufacturing technologies such as 3D printing. Possible economies arise for example in the area of the winding heads. Therefore generators that, despite multiple windings connected in succession, do not become longer or become only insignificantly longer also become useful.

A new network architecture for ships having large onboard system capacities (e.g. cruise ships, navy (new classes with increased demand for electrical power in addition to the drive outputs, FPSO; FSRU; . . . )) allows an efficient power supply to be realized with the integration of multiple closed DC ring buses on different voltage levels. The increased use of DC buses allows distribution transformers, which are required for AC systems, to be reduced.

On the basis of one of the described configurations of the power supply system, it is possible for an AC/DC/AC conversion at the upper voltage level to be dispensed with in the floating facility and for the DC/AC/DC conversion between the voltage levels to be simplified. If the lower system, that is to say the system having a lower voltage, is a DC system, the frequency of the feeding AC voltage can be selected in optimum fashion.

The use of multiple DC ring buses having different voltage levels is ensured by fast-switching semiconductor switches and allows a more optimum and reliable load distribution between the buses and a more optimum distribution and use of energy stores between the individual zones. The loads of the second and lower voltage levels can be fed at a fixed, freely allocable frequency that is not dependent on the speed of the diesel generators, even if the upper voltage level is operated at variable frequency.

In conventional systems, the distribution transformers for the second voltage levels are of redundant design. If the hotel capacity is 10 MW, for example, the installed total capacity of the distribution transformers is at least 20 MW. Owing to additional safeties and in consideration of simultaneity factors, this value once again significantly increases to values of between 25 MW and 30 MW. The generators for the second voltage level need to be designed only for the 20 MW in total, however. At the same time, the installed generator capacity decreases by the proportion of the onboard system capacity, that is to say by 10 MW in the example. It is thus necessary for 10 MW more generator capacity to be installed in total in order to save approximately 25-30 MW of transformer capacity to be installed.

The various power supply systems and water-bound facilities described, and the methods described, can have their features combined in a variable manner. This allows the applicable system, the applicable facility or method to be adapted e.g. for use in a cruise ship, a crane ship, an oil platform, etc.

BRIEF DESCRIPTION OF THE DRAWINGS

The invention is described by way of illustration below with reference to figures. The same reference signs are used for units of the same type. In the figures:

FIG. 1 shows a ship with a first division into zones,
FIG. 2 shows a ship with a second division into zones,
FIG. 3 shows a ship with a third division into zones,
FIG. 14 shows a ninth circuit diagram for a power supply system,
FIG. 15A shows part A of a tenth circuit diagram for a power supply system,
FIG. 16 to 24 show further configurations of power supply systems.

DETAILED DESCRIPTION OF INVENTION

Figure 4:
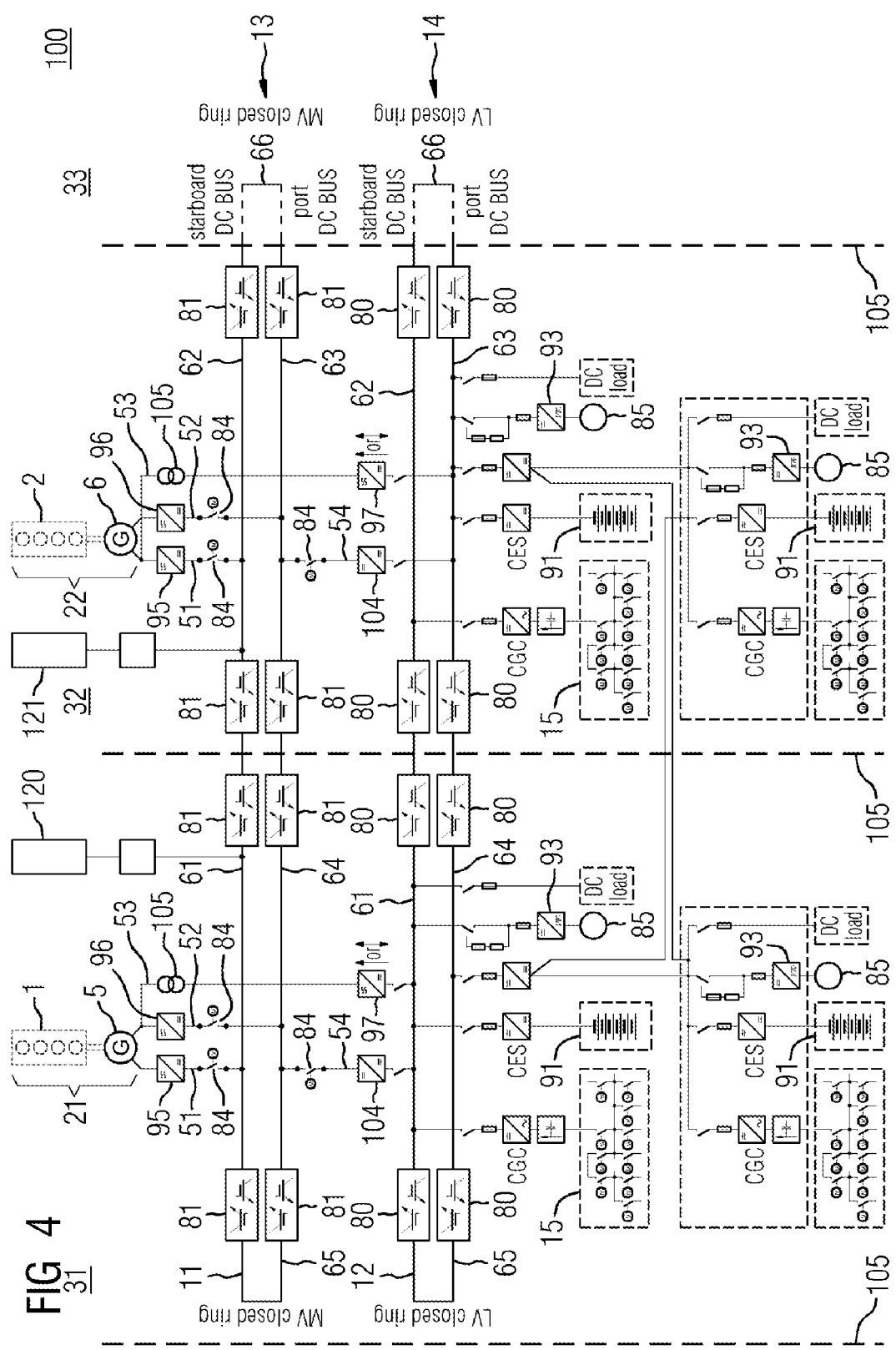
FIG. 4 shows a first circuit diagram for a power supply system.

The depiction according to FIG. 1 shows a ship 101 with a first division into zones. The depiction shows a first zone 31, a second zone 32, a third zone 33 and a fourth zone 34. These zones are bounded by bulkheads 71 and a watertight deck 70.

The depiction according to FIG. 2 shows a ship 101 in a kind of plan view, with a second division into zones 31 to 39. The zones can also be divided into longitudinal zones 102 and transverse zones 103. A power supply system 100 extends via the zones. The power supply system has a first DC voltage bus 11 and a second DC voltage bus 12. The DC voltage buses 11 and 12 extend via the zones in different ways.

The depiction according to FIG. 3 shows a ship 100 with a third division into zones 31 to 39, the zones 37, 38 and 39 being central zones inside the ship and being bounded by further zones on the port side and the starboard side. The power supply system 100 has a first DC voltage bus 11 and a second DC voltage bus 12, the first DC voltage bus 11 being a medium-voltage bus and the second DC voltage bus 12 being a low-voltage bus, for example.

The depiction according to FIG. 4 shows a first circuit diagram for a power supply system 100. The depiction has a first zone 31, a second zone 32 and a third zone 33. The zones are marked by zone boundaries 105. The first zone 31 contains a first power source 21. The first power source 21 comprises a diesel engine 1 and a generator 5. The second zone 32 contains a second power source 22. The second power source 22 comprises a diesel engine 2 and a generator 6. A first DC voltage bus 11 extends both into the first zone 31 and into the second zone 32, and also into the third zone 33, and forms a ring bus. A second DC voltage bus 12 extends both into the first zone 31 and into the second zone 32, and also into the third zone 33, and also forms a ring bus. The first DC voltage bus 11 is at, or provides, a first DC voltage level 13. The second DC voltage bus 12 is at, or provides, a second DC voltage level 14. The first DC voltage bus 11 is divisible into sections 61 to 66. The division is accomplished by means of MV switching devices 81. The first DC voltage bus 11 is thus at a medium voltage. The second DC voltage bus 12 is also divisible into sections 61 to 66. The division is accomplished by means of LV switching devices 80. The second DC voltage bus 12 is thus at a low voltage. A three-phase bus (AC bus) 15 is able to be fed via the second DC voltage bus 12. Batteries 91 are also connected to the second DC voltage bus 12. The loads shown for the second DC voltage bus 12 are motors (asynchronous motors) 85, which are operable via inverters 93.

For the purpose of feeding the DC voltage buses 11 and 12 there is provision in each case for a first feed 51, a second feed 52, a third feed 53 and a fourth feed 54. These feeds are feeding electrical connections for the DC buses. The generator 5 uses the first feed 51 to feed the first section 61, the first feed 51 comprising a rectifier 95 and a switch 84. The generator 5 uses the second feed 52 to feed the fourth section 64 of the first DC voltage bus 11. The second feed 52 in the first zone 31 likewise comprises a rectifier 96 and a switch 84. The third feed 53 comprises a medium-voltage transformer 105 and a rectifier 97. The third feed 53 feeds the first section 61 of the second DC voltage bus 12. The fourth feed 54 comprises a switch 84 and a DC/DC chopper 104. The fourth feed 54 therefore connects a section 64 of the first DC bus 11 to a section 61 of the second DC bus 12. In the second zone 32, the generator 6 is connected to the DC buses 11 and 12 in the same way via the feeds 1 to 4 as described in the first zone 31.

Figure 5:
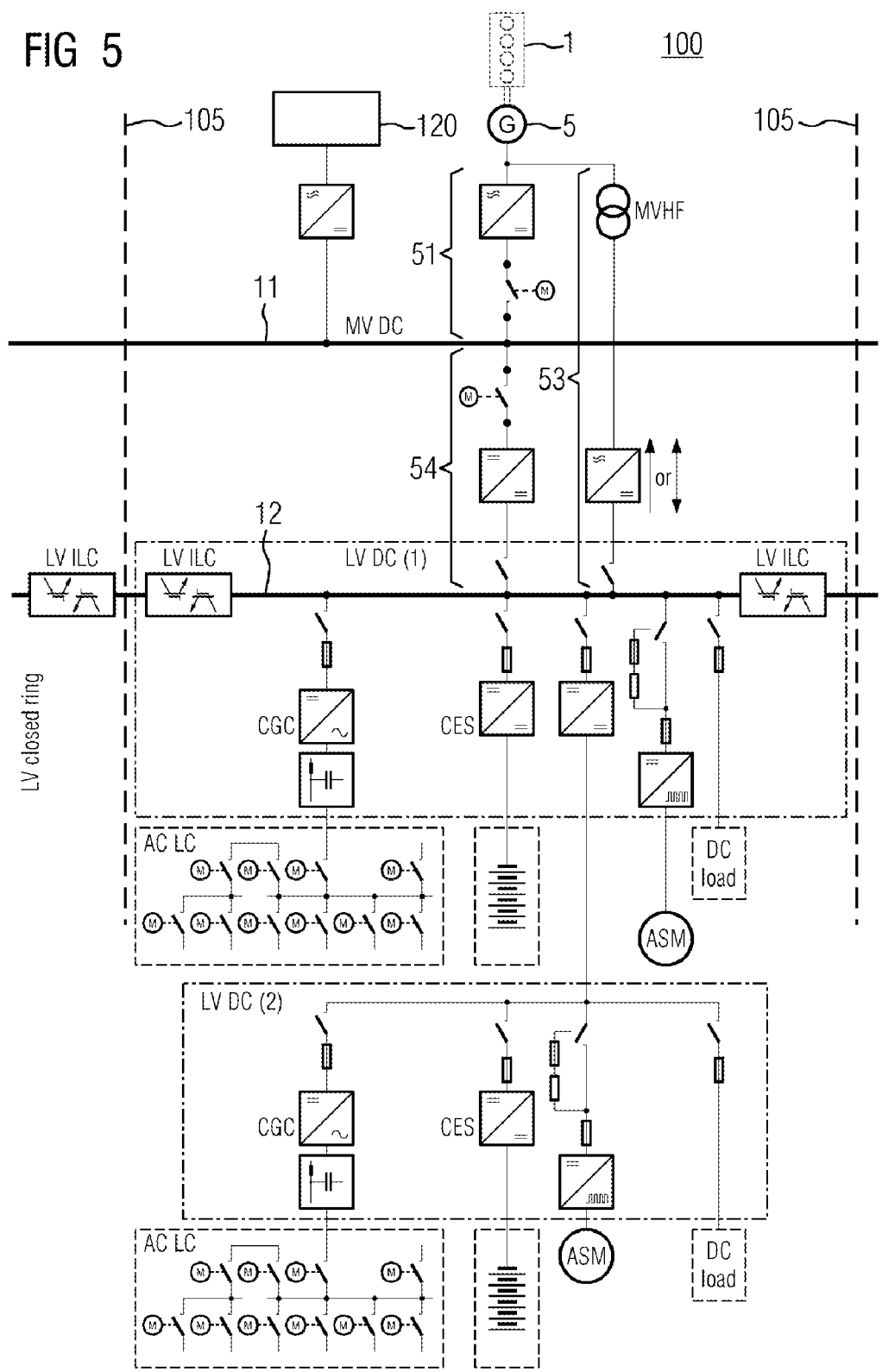
FIG. 5 shows a second circuit diagram for a power supply system.

The depiction according to FIG. 5 shows a second circuit diagram for a power supply system 100. An enlarged detail is shown here in comparison with FIG. 4. In contrast to FIG. 4, FIG. 5 depicts a variation by showing a generator 5 that has only three feeding electrical connections 51, 53 and 54 to the DC buses 11 and 12.

Figure 6:
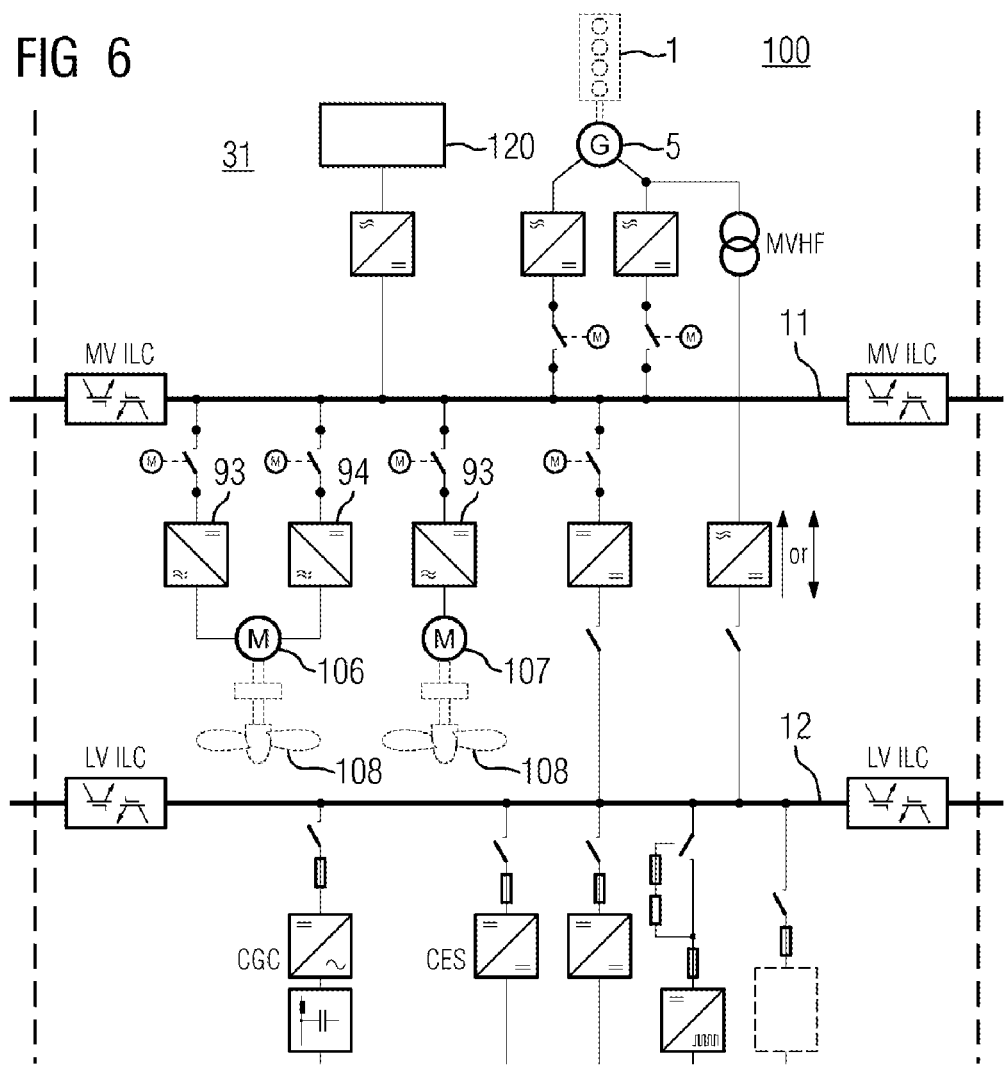
FIG. 6 shows a third circuit diagram for a power supply system.

The depiction according to FIG. 6 shows a third circuit diagram for a power supply system 100. It is shown here that the loads connected to the first DC voltage bus 11 can be ship drive motors 106, 107, which are each intended to drive a propeller 108. The motor 106 is double-fed via the inverters 93 and 94. The motor 107 is single-fed.

Figure 7:
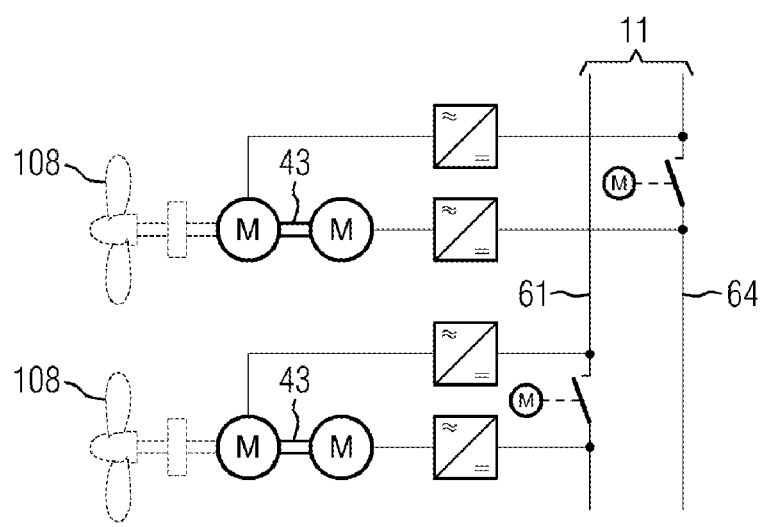
FIG. 7 shows a fourth circuit diagram for a power supply system.

The depiction according to FIG. 7 shows a fourth circuit diagram, wherein the propellers 108 have two respective motors connected to them via a shaft system 43 for driving. Here too, the feed is provided via the DC voltage bus 11, but via different sections 61 and 64 of this bus.

Figure 8:
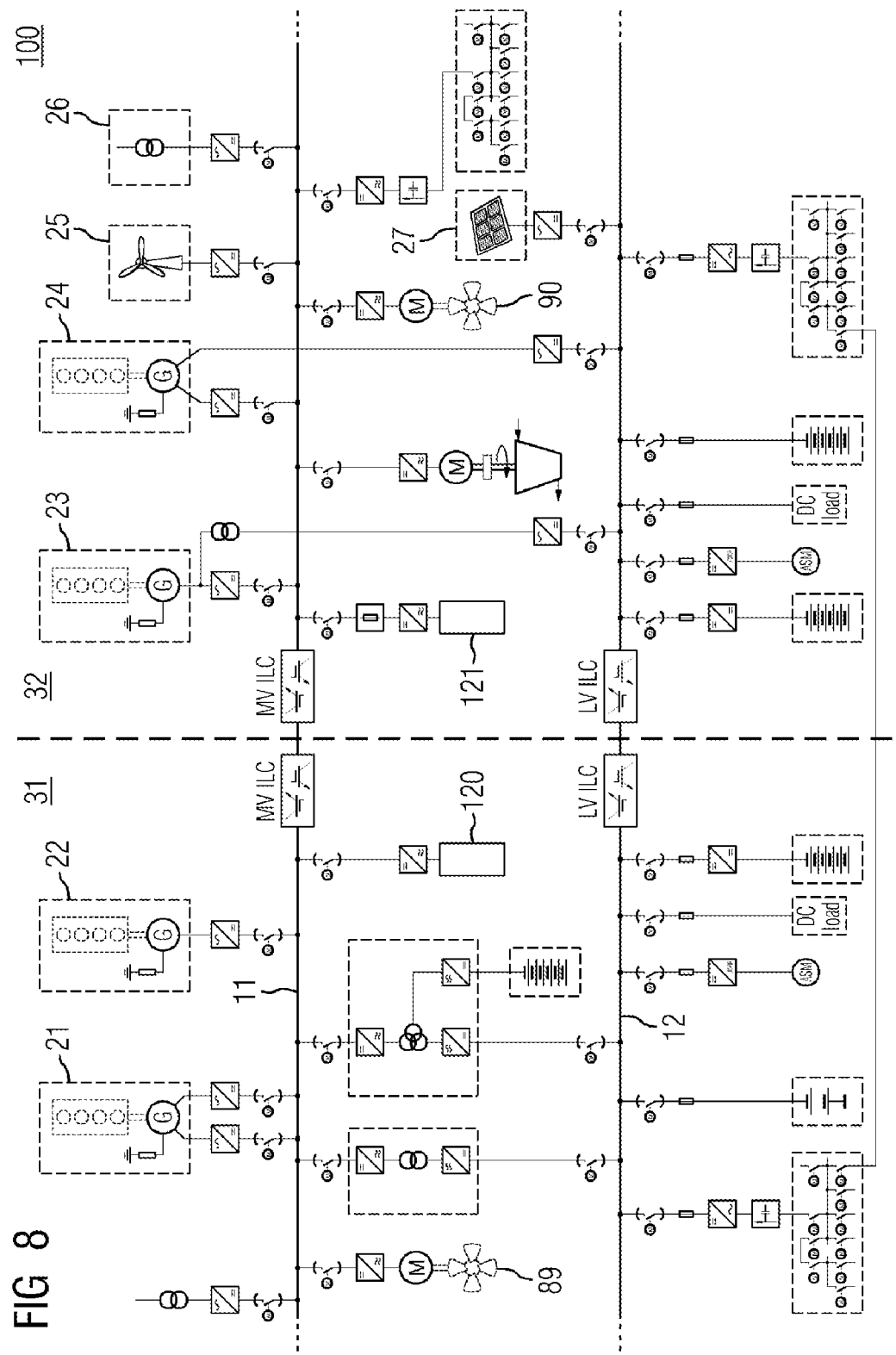
FIG. 8 shows a fifth circuit diagram for a power supply system.

The depiction according to FIG. 8 shows a fifth circuit diagram, wherein, besides four power sources 21 to 24 with a diesel engine, alternative power sources are also shown. A wind turbine 25 can be one power source. A shore terminal 26 can be one power source, or else a photovoltaic installation 27.

Figure 9:
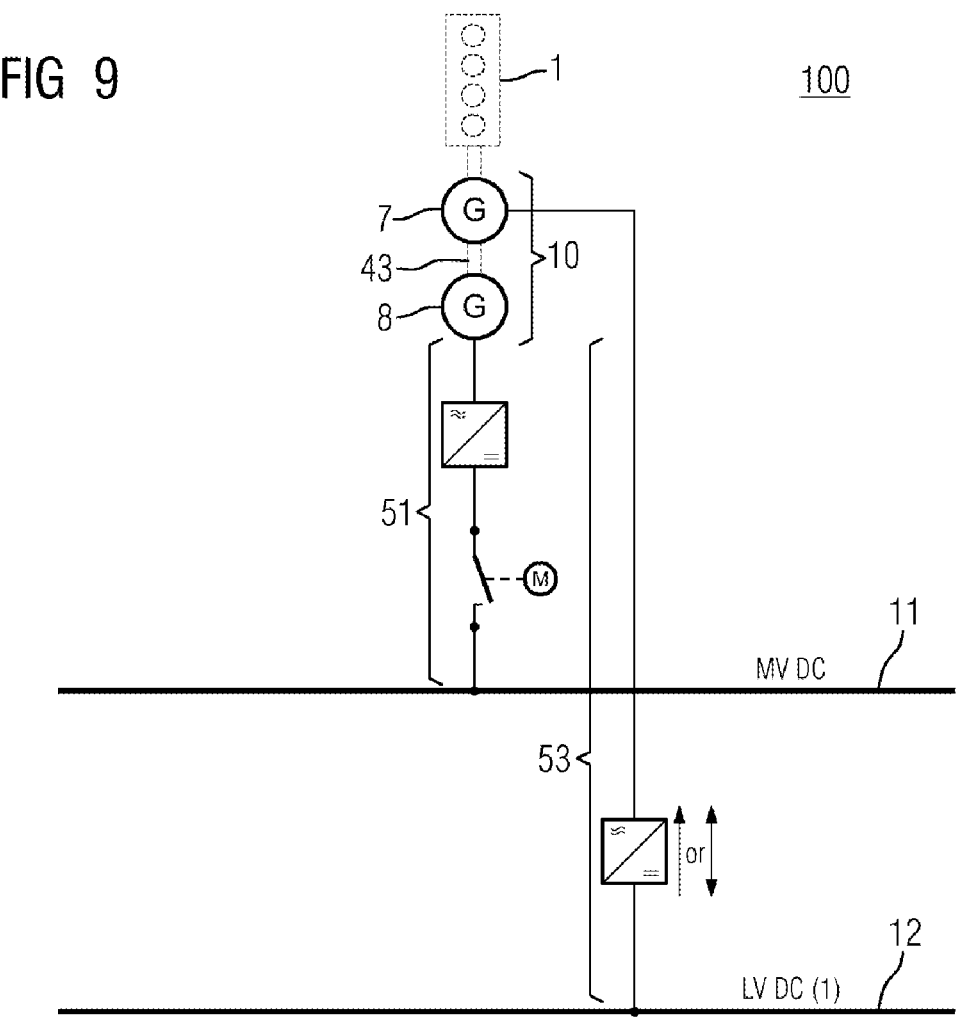
FIG. 9 shows a sixth circuit diagram for a power supply system.

The depiction according to FIG. 9 shows a generator system 10 having two generators 7 and 8, which are stiffly coupled via a shaft system 43. The generator 7 here has a low-voltage winding system and the generator 8 has a medium-voltage winding system. The generator 7 is used to feed a low-voltage DC bus 12 and the generator 8 is used to feed a medium-voltage DC bus 11.

Figure 10:
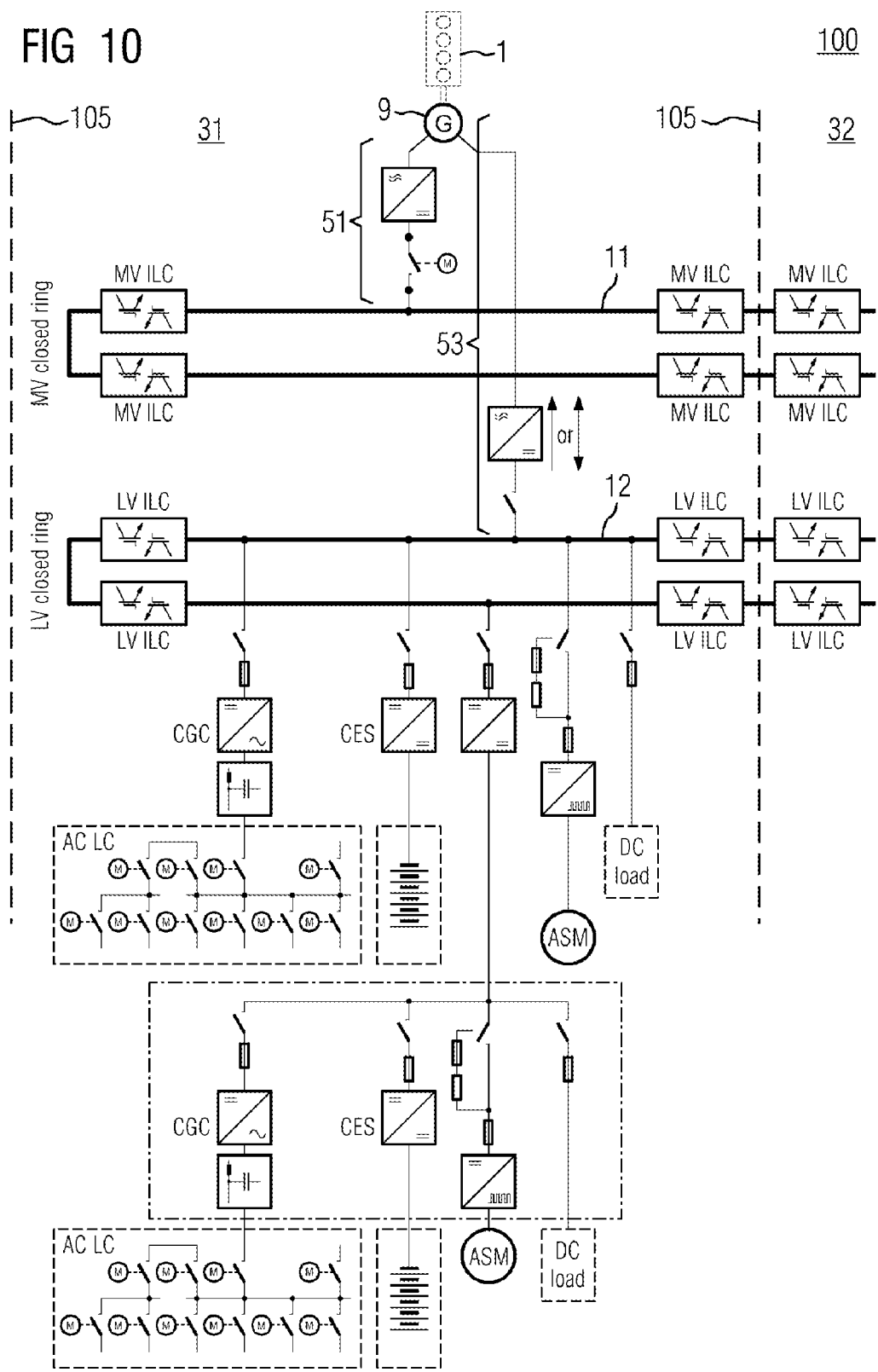
FIG. 10 shows a seventh circuit diagram for a power supply system.

The depiction according to FIG. 10 shows a multi-winding system generator 9 that has at least two winding systems, a first winding system for a medium voltage and a second winding system for a low voltage. The first winding system is used to feed the first DC bus 11 on the medium-voltage level (MV) via a first feeding electrical connection 51. The second winding system is used to feed the second DC bus 12 on the low-voltage level (LV) via another feeding electrical connection 53.

Figure 11:
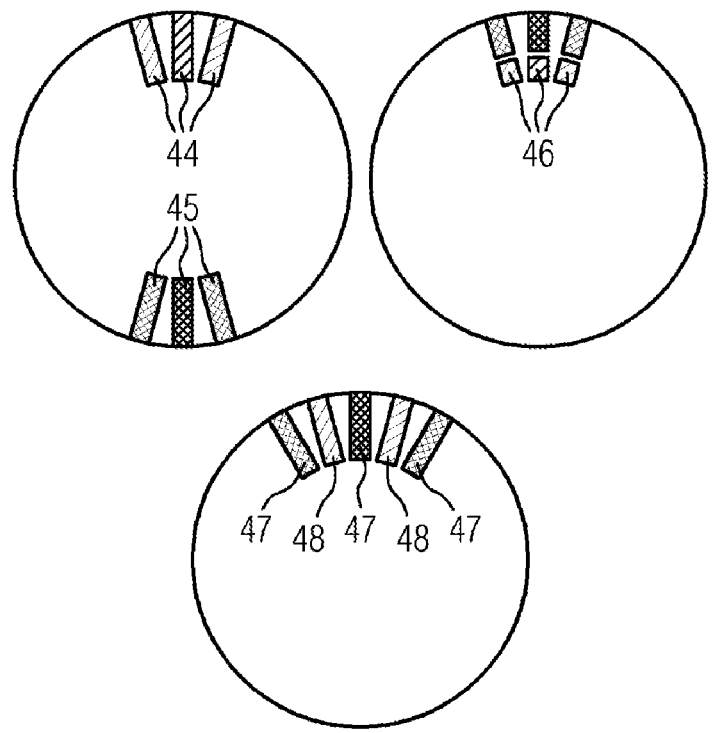
FIG. 11 shows winding systems.

The depiction according to FIG. 11 schematically shows the possible arrangements of windings in the stator of a multi-winding system generator. In a first variant, sections of the LV windings can be in grooves 44 situated next to one another and sections of the MV windings can be in grooves 45 situated next to one another. In a second variant, the MV windings and the LV windings can be in common grooves 46. In a third variant, the MV windings and the LV windings can alternately be in grooves 24 and 48.

Figure 12:
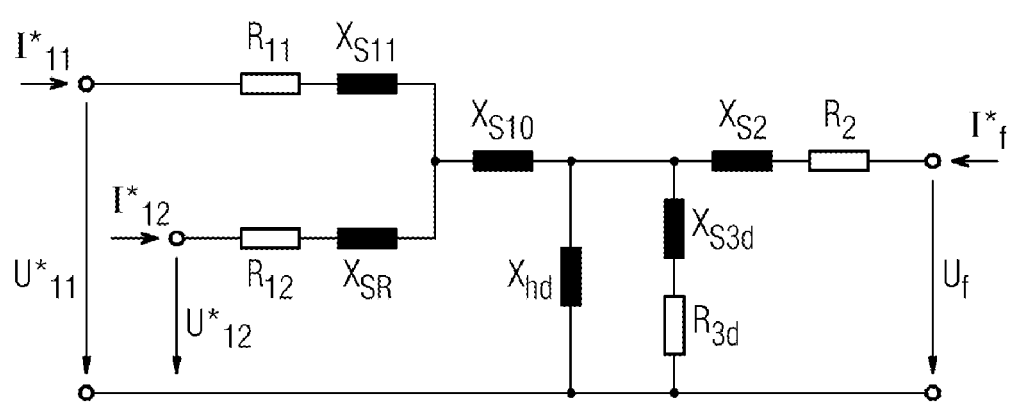
FIG. 12 shows an equivalent circuit.

The depiction according to FIG. 12 shows an equivalent circuit diagram for a D-axis of a multi-winding system generator.

Figure 13:
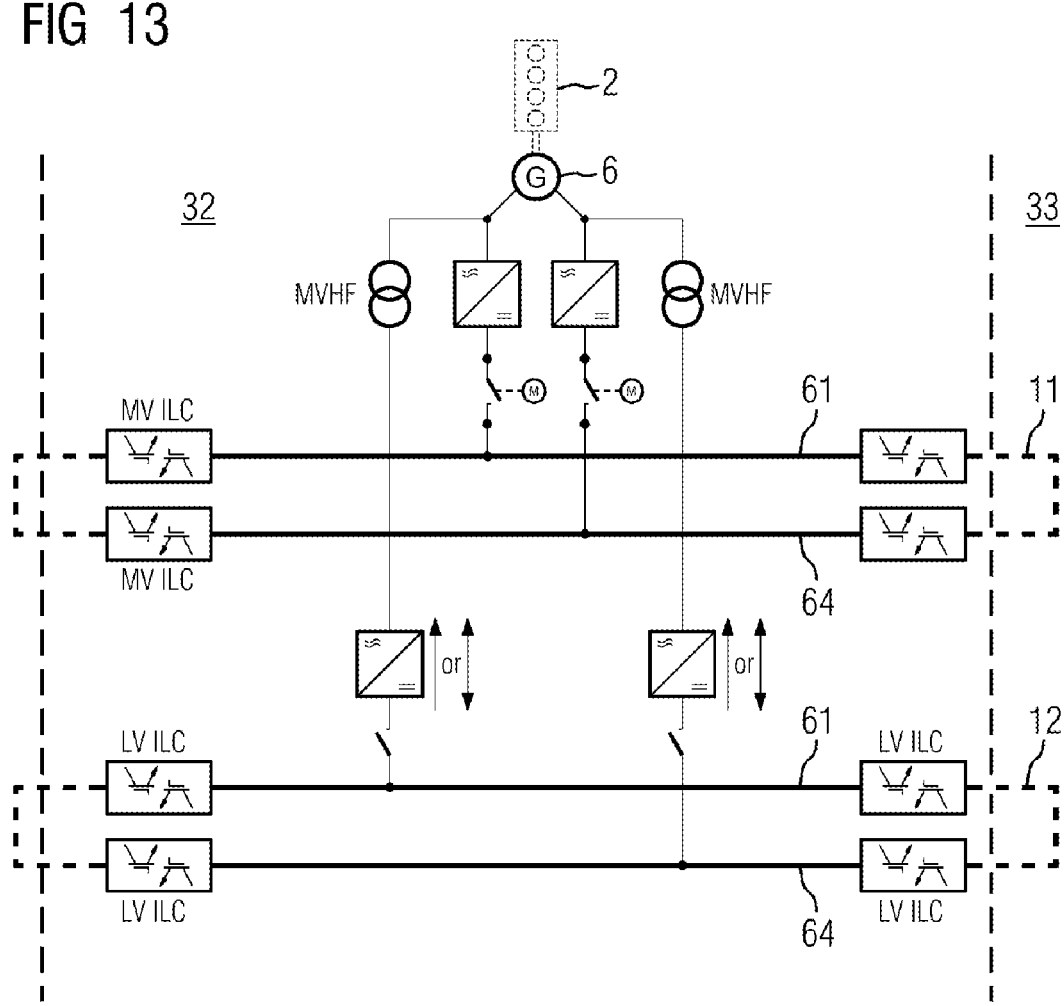
FIG. 13 shows an eighth circuit diagram for a power supply system.

The depiction according to FIG. 13 shows an eighth circuit diagram for a power supply system 100, it being shown how the generator 6 can feed the first DC voltage bus 11 via two different sections 61 and 64 and how this generator 6 can also feed the second DC voltage bus 12 via, in that case too, two different sections.

The depiction according to FIG. 14 shows how a generator in a zone (generator 5 in zone 31 and generator 6 in zone 32) is able to feed in each case two sections 61 and 62 of the first DC voltage bus 11 in different zones 31 and 32 and how this also applies to the second DC voltage bus 12.

Figure 15B:
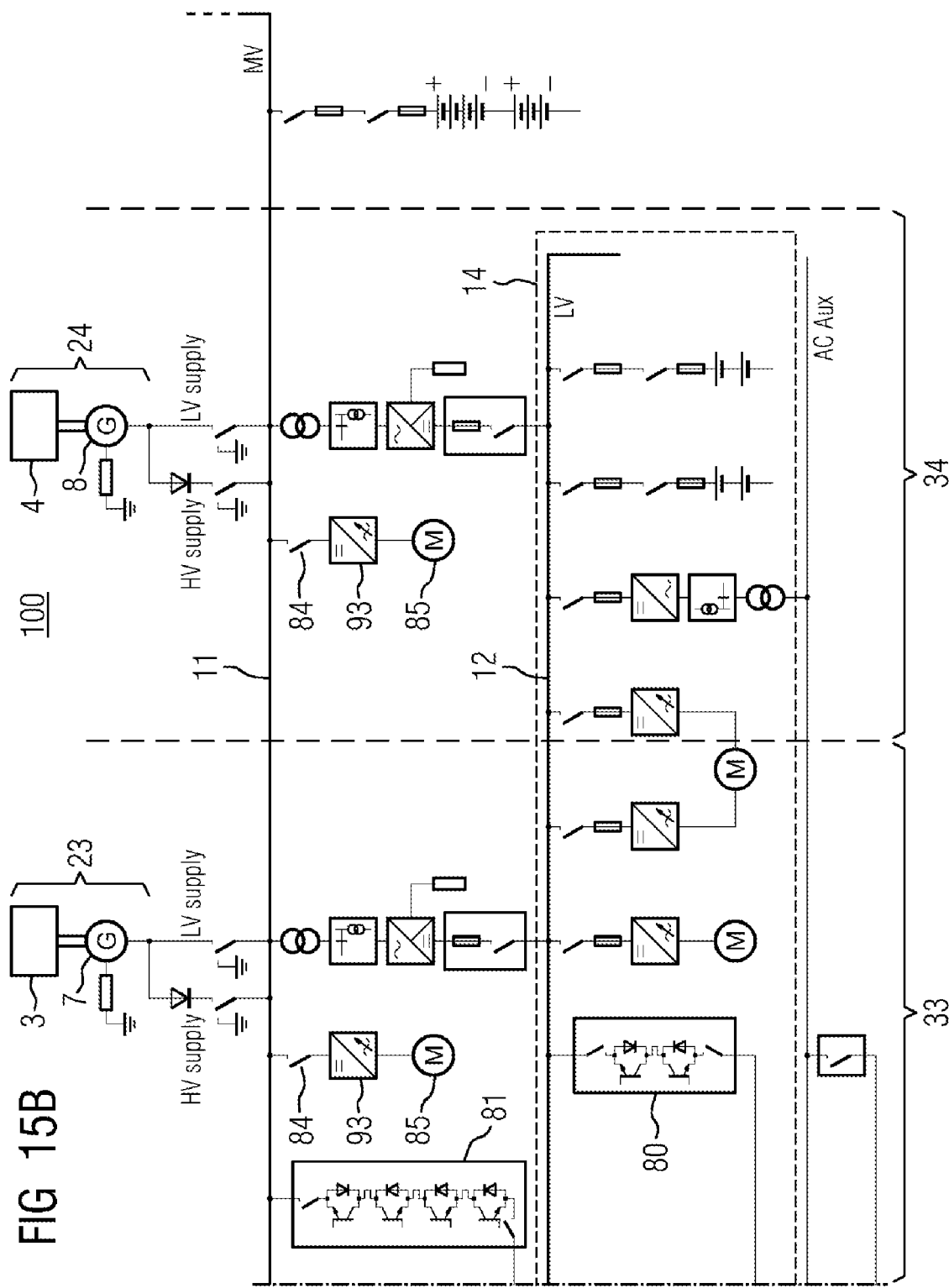
FIG. 15B shows part B of the tenth circuit diagram for a power supply system.
Figure 16:
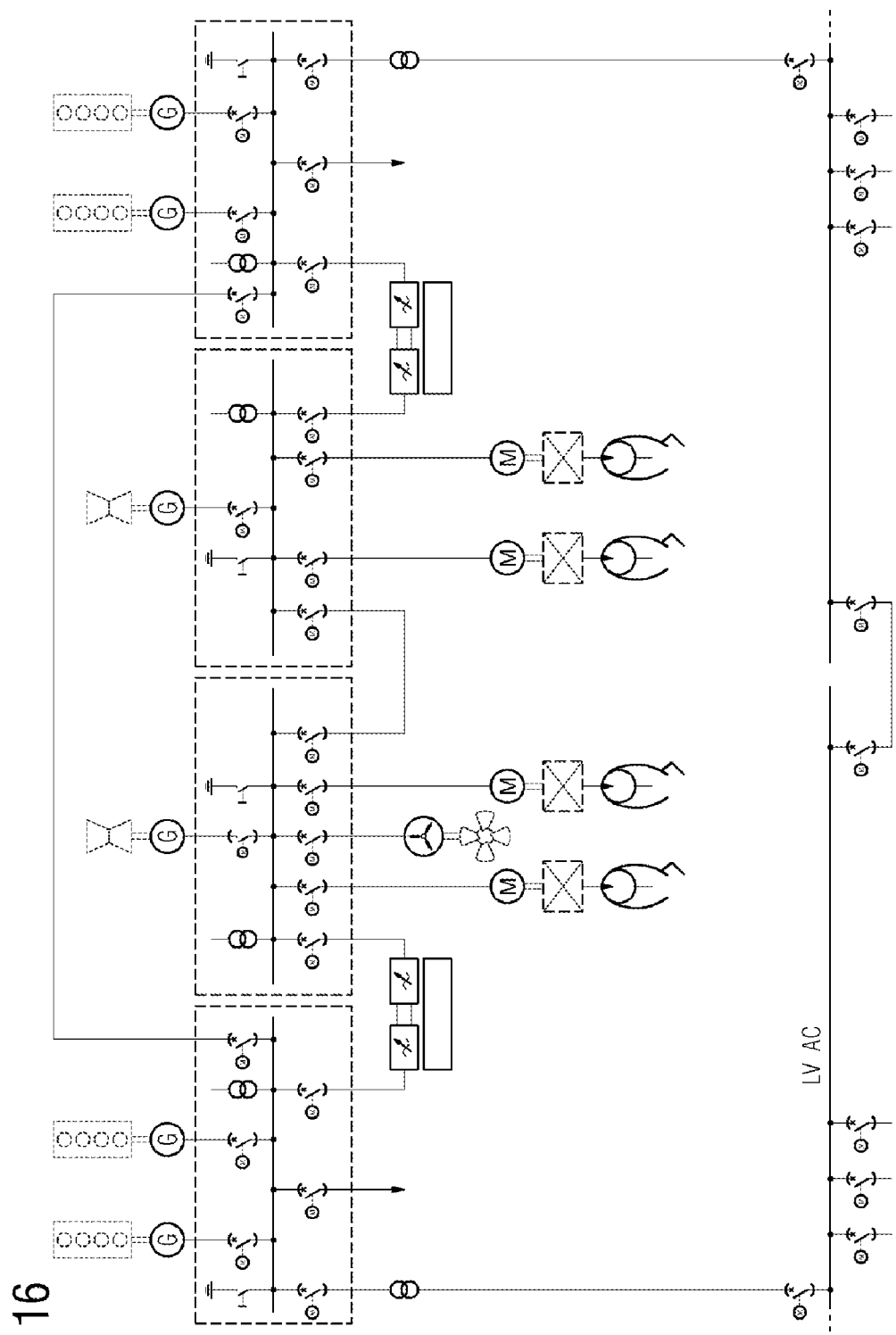
Figure 17:
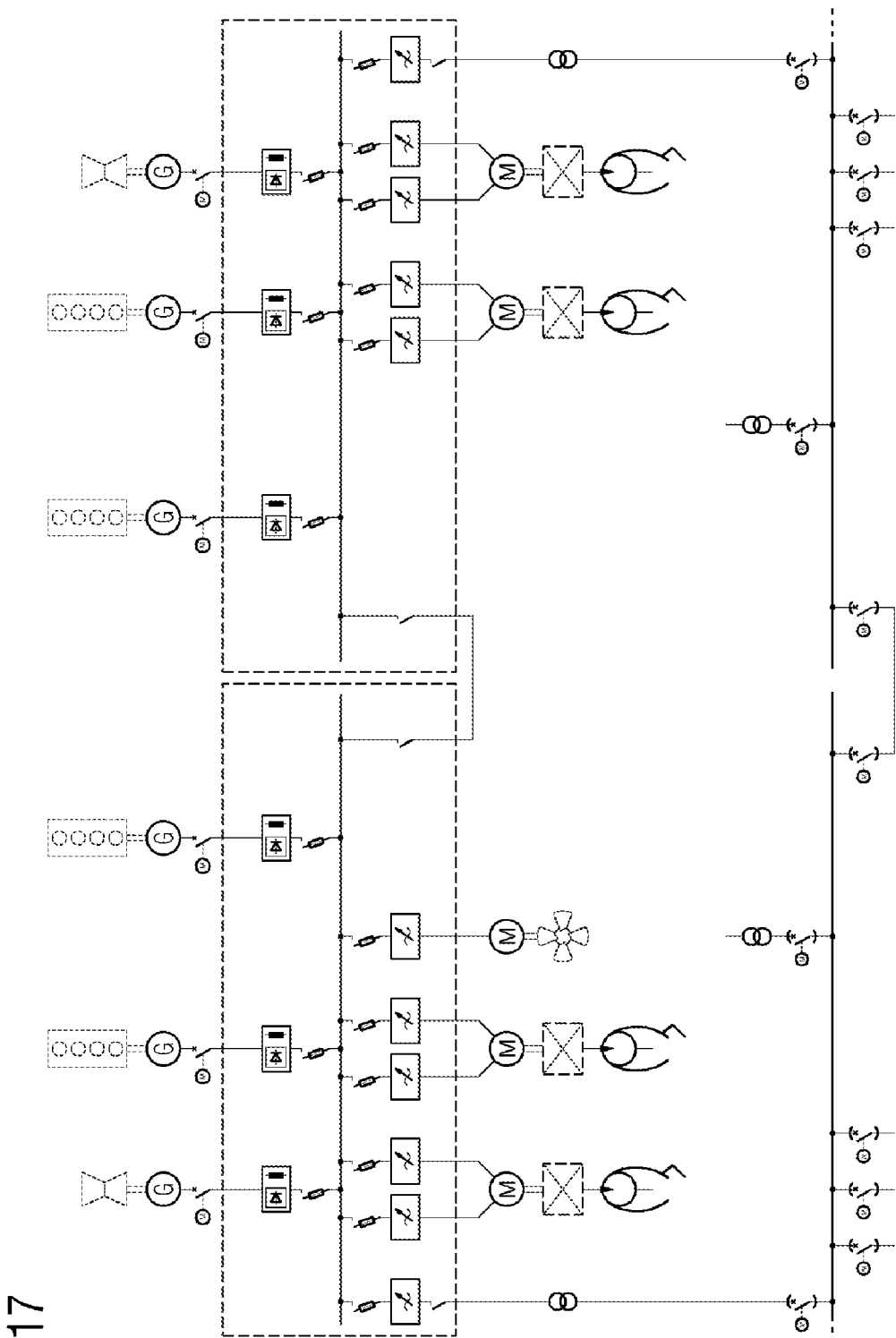
Figure 18:
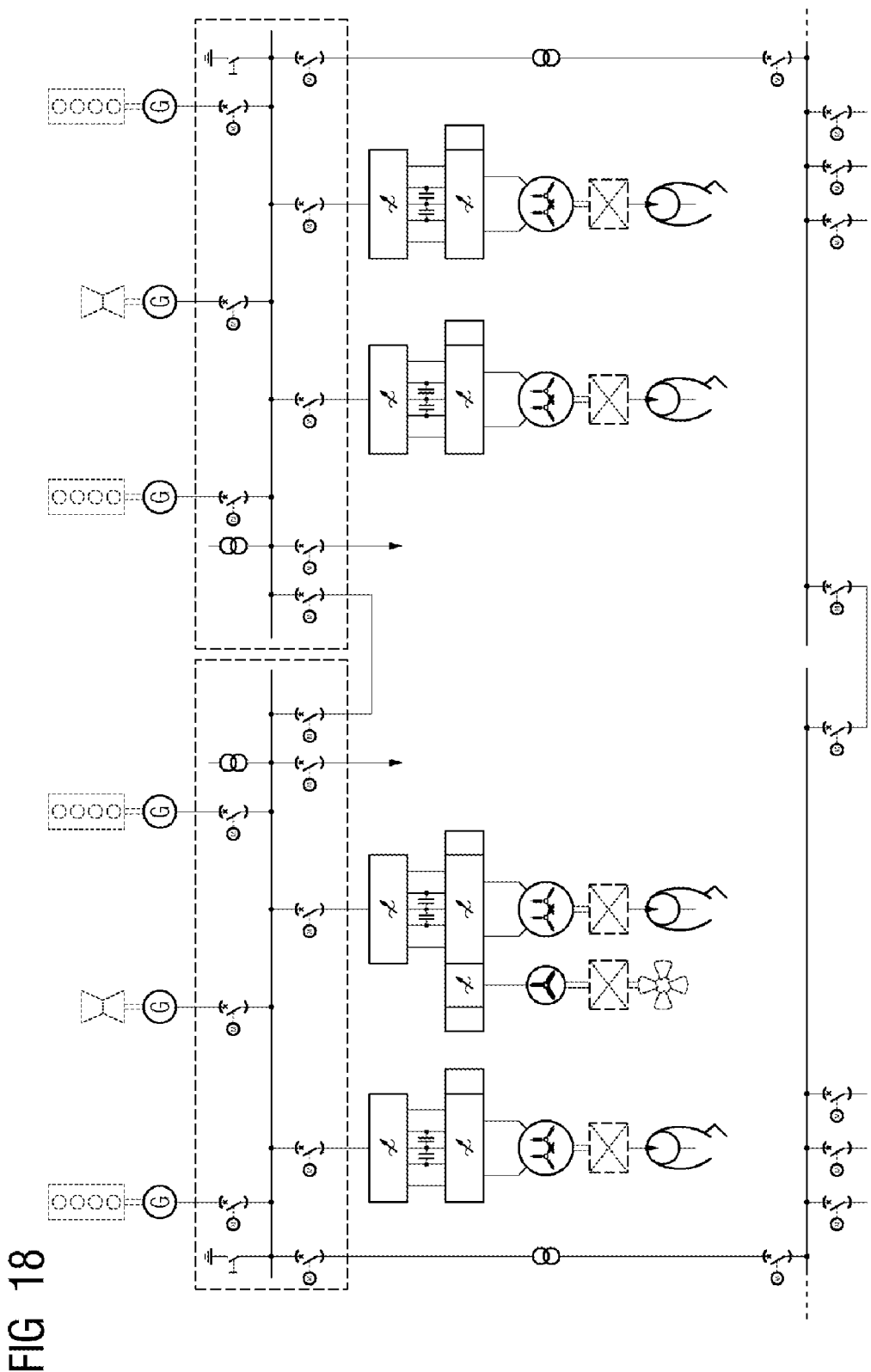
Figure 19:
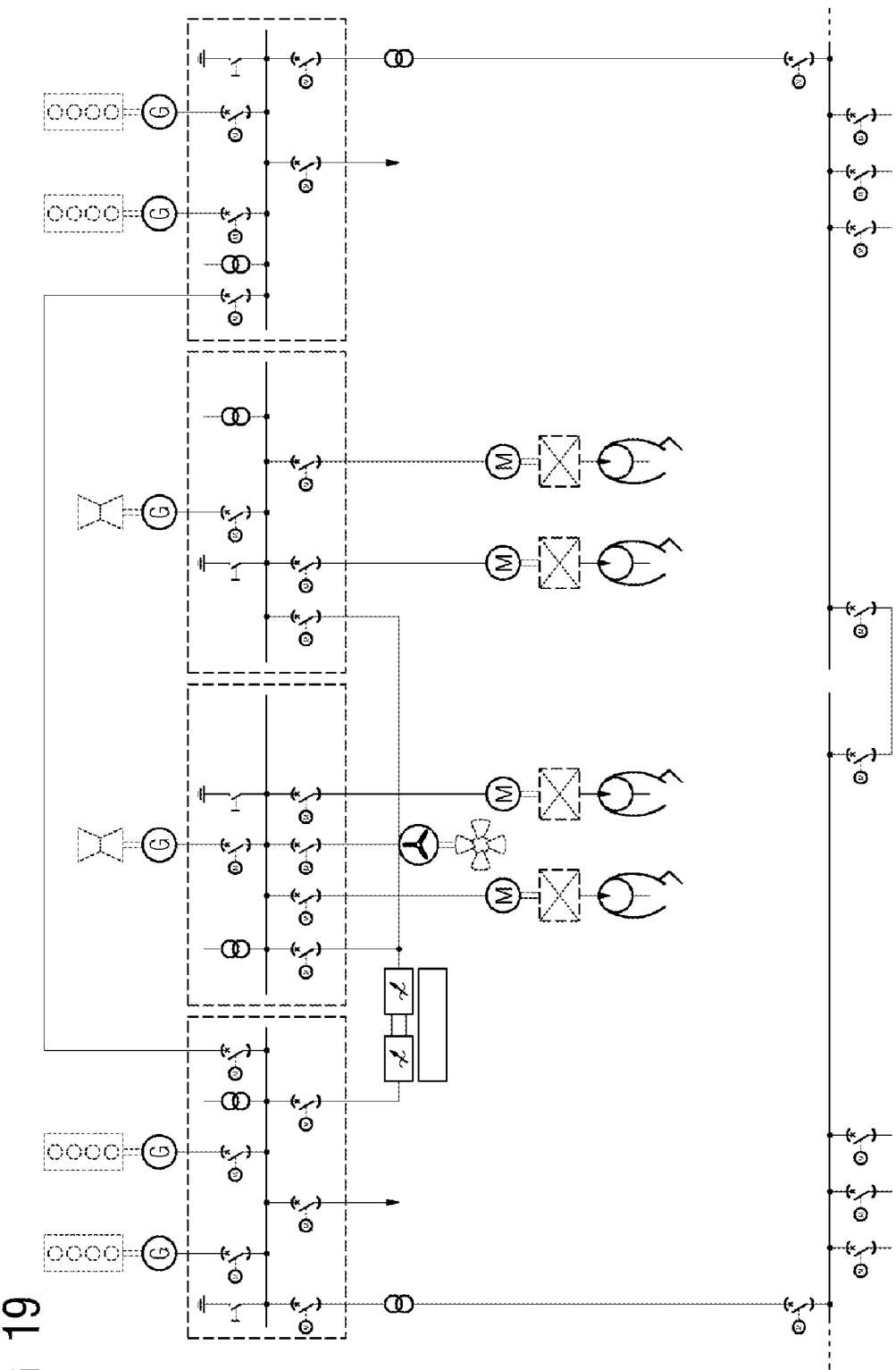
Figure 20:
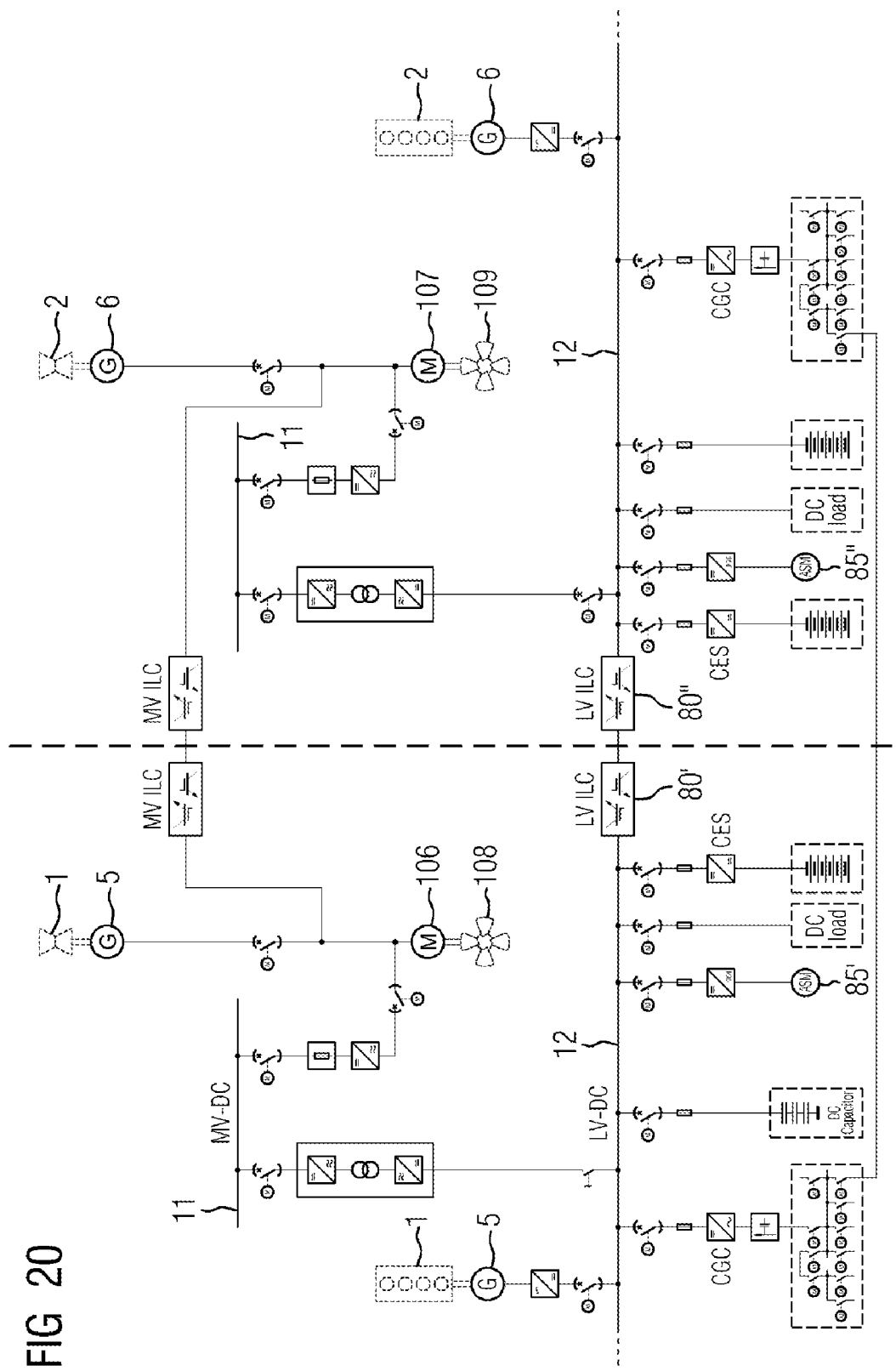
Figure 21:
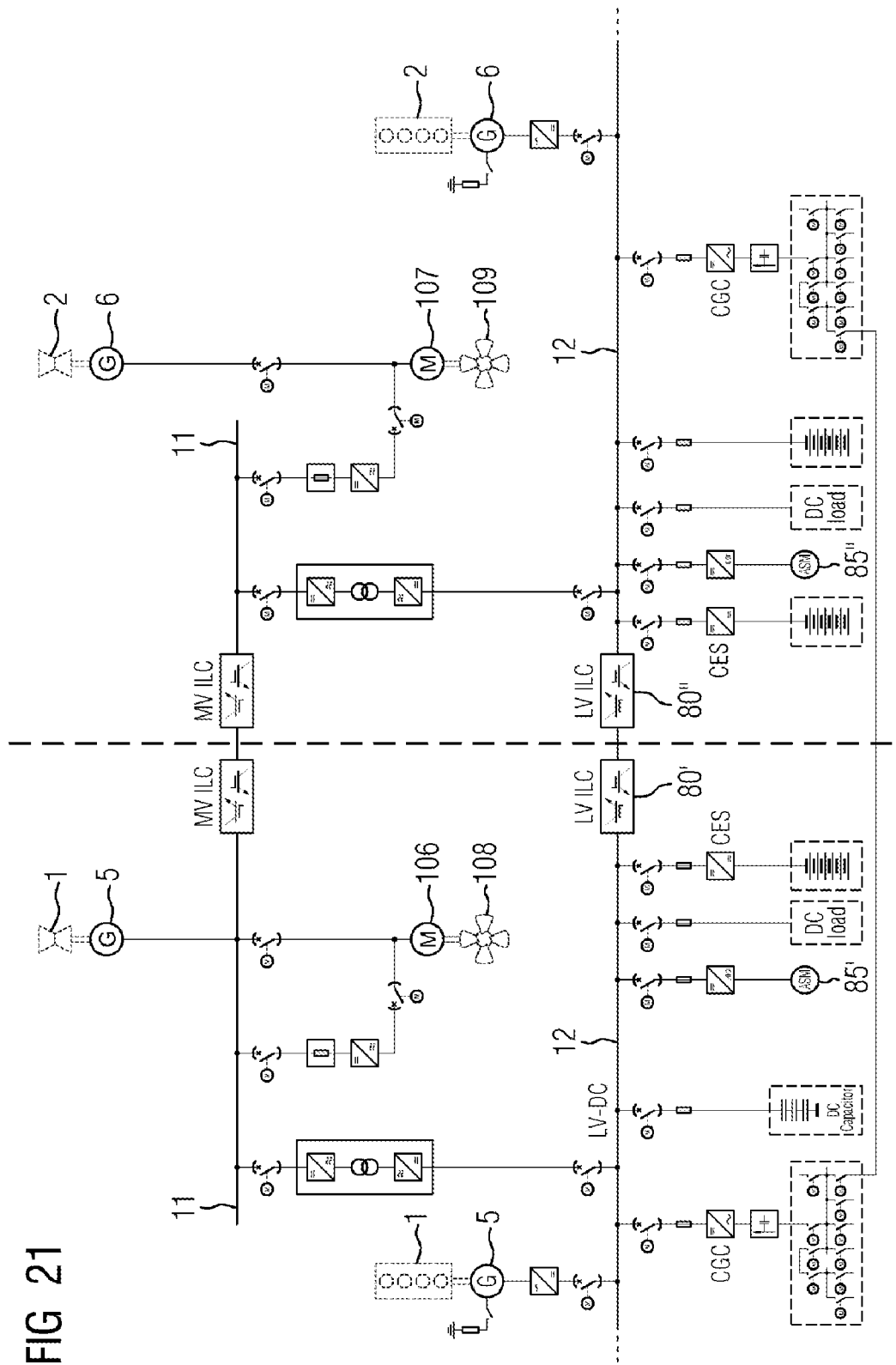
Figure 22:
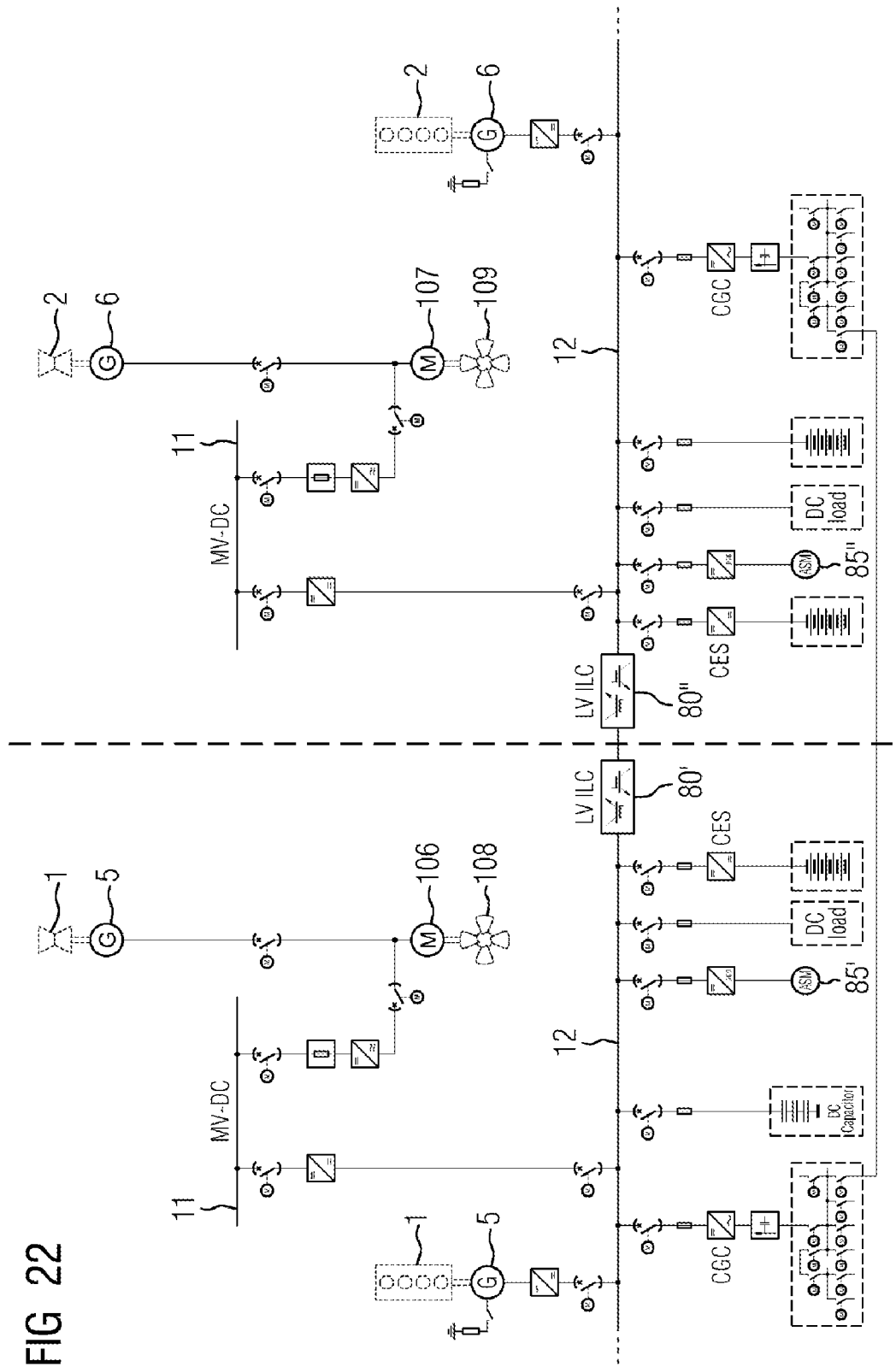
Figure 23:
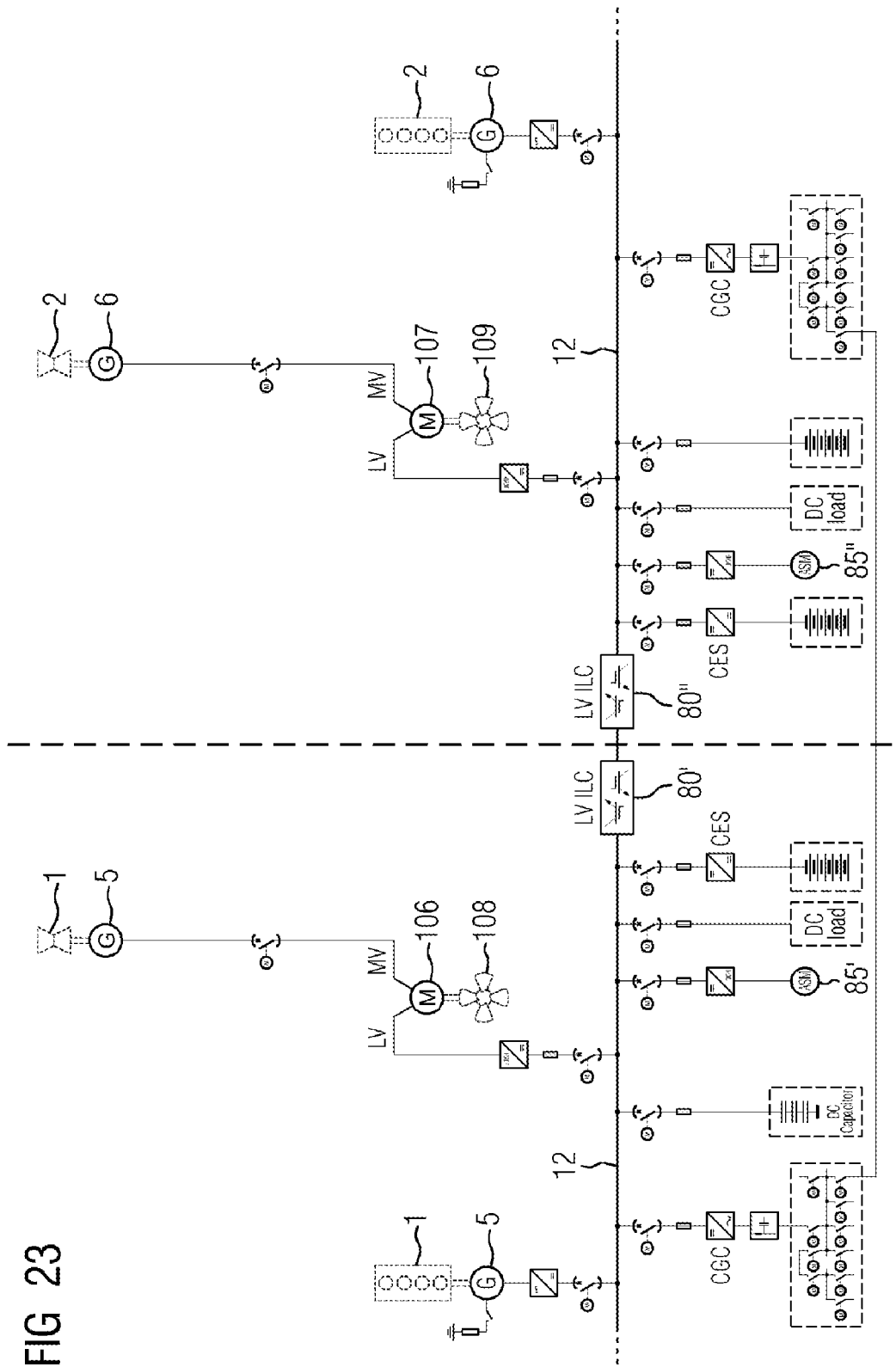

The depiction according to FIG. 15 is split into two partial FIGS. 15A and 15B. Both combine a power supply system 100 that comprises four diesel engines 1, 2, 3 and 4 as part of the power sources 21, 22, 23 and 24 and shows that the power supply system is able to be extended or changed almost arbitrarily in accordance with the demands on the water-bound facility. As a result of the water-bound facility being located on a ship or a drilling rig, for example, it is operated entirely or predominantly as an island system.

The depictions according to FIGS. 16 to 23 show further examples and variants of power supply systems in particular on ships.

The depiction according to FIG. 24 shows a ship having three zones 31, 32 and 33. In the first zone 31, each of the generators 5 is driven by a respective internal combustion engine 1, e.g. a diesel engine. The operating motor 106 has a propulsion unit in the form of a variable-pitch propeller 108 mechanically coupled to it. A generator 5 and the internal combustion engine 1 driving it, and the variable-pitch propeller 108 and the operating motor 106 driving it, can additionally also have a mechanical gear unit connected between them, this not being depicted, however. As an alternative to the variable-pitch propeller, it is also possible for a non-adjustable propeller to be used.

In the third zone 33, each of the generators 6 is driven by a respective internal combustion engine 2, e.g. a diesel engine. The operating motor 107 has a propulsion unit in the form of a variable-pitch propeller 109 mechanically coupled to it. A generator 6 and the internal combustion engine 2 driving it, and the variable-pitch propeller 109 and the operating motor 107 driving it, can additionally also have a mechanical gear unit connected between them, this not being depicted, however. As an alternative to the variable-pitch propeller, it is also possible for a non-adjustable propeller to be used.

The operating motors 106 and 107 are ship drive motors, which are embodied in particular as medium-voltage motors.

The operating motor 106 is operated without an interposed converter at the voltage having variable amplitude and variable frequency that is produced by the generators 5, this making up the electrical shaft. The rotation rate of the operating motor 106 is dependent on the number of pole pairs thereof. The control and/or regulation of the speed of the operating motor 106 and hence of the variable-pitch propeller 108 is therefore effected indirectly by the control and/or regulation of the internal combustion engines 1 for driving the generators 5. A rotational movement of the internal combustion engine 1 or of the generators 5 therefore brings about a correspondingly proportional rotational movement of the operating motor 106. The function of a mechanical shaft is therefore replicated using electrical machines.

The operating motor 107 is operated without an interposed converter at the voltage having variable amplitude and variable frequency that is produced by the generators 6, this making up the electrical shaft. The rotation rate of the operating motor 107 is dependent on the number of pole pairs thereof. The control and/or regulation of the speed of the operating motor 107 and hence of the variable-pitch propeller 109 is therefore effected indirectly by the control and/or regulation of the internal combustion engines 2 for driving the generators 6. A rotational movement of the internal combustion engine 2 or of the generators 6 therefore brings about a correspondingly proportional rotational movement of the operating motor 107. The function of a mechanical shaft is therefore replicated using electrical machines.

The voltage having variable amplitude and variable frequency that is produced by the generators of an electrical drive shaft is additionally used to operate a respective onboard system converter 115, 116 that converts this variable voltage into a DC voltage for an LV DC bus 117 for the onboard system. There is a further internal combustion engine 3 for the onboard system, and a generator 7 assigned to said internal combustion engine, the output AC voltage of which generator can be converted into the LV DC voltage via a rectifier 118.

The invention claimed is:

1. A power supply system for a water-bound facility, comprising:
an electrical shaft, wherein the electrical shaft is connectable to a first DC voltage bus for a first DC voltage and to a second DC voltage bus for a second DC voltage,
wherein the electrical shaft comprises at least one variable-speed generator, driven by an internal combustion engine, for producing a motor voltage having variable amplitude and variable frequency and at least one variable-speed drive motor that is supplied with this motor voltage and coupled to a propulsion unit,
wherein the first DC voltage bus is intended for a first DC voltage and the second DC voltage bus is intended for a second DC voltage, the first DC voltage being higher than the second DC voltage, and
a coupling between the first DC bus and the second DC bus, wherein electrical power is transported from a low-voltage DC voltage bus to a higher-voltage DC voltage bus in order to supply at least one electrical shaft with electrical power.

2. The power supply system for a water-bound facility as claimed in claim 1,
wherein the water-bound facility has a first zone and a second zone,
having a first power source and
having a second power source,
wherein the first power source in the first zone is intended to feed at least one DC voltage bus of the at least two DC voltage buses and
wherein the second power source in the second zone is intended to feed at least one DC voltage bus of the at least two DC voltage buses, wherein at least part of the power supply system is subdivided in zone-dependent fashion.

3. The power supply system as claimed in claim 1,
wherein at least one of the DC voltage buses is able to be in the form of a ring bus.

4. The power supply system as claimed in claim 1,
wherein at least one of the DC voltage buses is intended to extend via at least two zones.

5. The power supply system as claimed in claim 1, wherein at least one of the DC voltage buses has sections, the sections being zone-related.

6. The power supply system as claimed in claim 1, wherein the first power source in the first zone is intended to feed the first DC voltage bus and the second DC voltage bus.

7. The power supply system as claimed in claim 1, wherein different electrical shafts are in different zones.

8. The power supply system as claimed in claim 1, wherein the internal combustion engine is a gas turbine.

9. A method for operating a power supply system of a water-bound facility as claimed in claim 1, the method comprising:
transporting electrical power from a low-voltage DC voltage bus to a higher-voltage DC voltage bus in order to supply at least one electrical shaft with electrical power.

10. The method as claimed in claim 9,
wherein the water-bound facility has a first zone and a second zone,
wherein the water-bound facility has a first power source and a second power source,
electrical power being transferred from the first zone to the second zone or from the second zone to the first zone.

11. The power supply system as claimed in claim 5, wherein the power supply system is subdivided by the sections.

12. The power supply system for a water-bound facility according to claim 1,
wherein a DC/DC converter is provided as coupling.

13. The power supply system for a water-bound facility according to claim 1,
wherein the DC/DC converter is a bidirectional DC/DC converter.

* * * * *